US006280325B1

(12) United States Patent
Fisk

(10) Patent No.: US 6,280,325 B1
(45) Date of Patent: Aug. 28, 2001

(54) COMPUTER NETWORK MANAGEMENT OF WIDE-AREA MULTI-PLAYER BINGO GAME

(75) Inventor: Michael G. Fisk, Jamestown, RI (US)

(73) Assignee: NetGain Technologies, LLC, Newport, RI (US)

( * ) Notice: Subject to any disclaimer, the term of this patent is extended or adjusted under 35 U.S.C. 154(b) by 0 days.

(21) Appl. No.: 09/311,461

(22) Filed: May 13, 1999

(51) Int. Cl.[7] .................................................... A63F 13/12
(52) U.S. Cl. ............................... 463/19; 463/42; 273/269
(58) Field of Search ................................ 463/16, 17, 18, 463/19, 40, 41, 42; 273/269, 274, 139, 138.1, 138.2, 236, 237

(56) References Cited

U.S. PATENT DOCUMENTS

| | | | | |
|---|---|---|---|---|
| 4,661,906 | * | 4/1987 | DiFrancesco et al. | 364/410 |
| 4,909,516 | * | 3/1990 | Kolinsky | 273/237 |
| 5,679,077 | * | 10/1997 | Pocock et al. | 463/19 |
| 5,687,971 | * | 11/1997 | Khaladkar | 273/269 |
| 5,904,619 | | 5/1999 | Scagnelli et al. | 463/17 |
| 5,910,047 | | 6/1999 | Scagnelli et al. | 463/17 |
| 5,921,865 | | 7/1999 | Scagnelli et al. | 463/17 |
| 5,922,053 | * | 7/1999 | Okada | 709/238 |
| 5,951,396 | * | 9/1999 | Tawil | 463/19 |
| 6,024,641 | * | 2/2000 | Sarno | 463/17 |
| 6,099,407 | * | 8/2000 | Parker, Jr. et al. | 463/19 |

* cited by examiner

*Primary Examiner*—Valencia Martin-Wallace
*Assistant Examiner*—Julie K Kasick
(74) *Attorney, Agent, or Firm*—Wood, Herron&Evans, L.L.P.

(57) ABSTRACT

A computer network which manages multiple simultaneous bingo games having a potentially large number of bingo cards. The computers simultaneously and in parallel compare called bingo numbers to bingo cards stored in each respective computer (and also double-verfy winning cards). Called numbers may be applicable to one, many, or all of the simultaneous bingo games, and the games may have different times or different rules. Bingo cards are distributed in the network in accordance with number of hits needed by the cards: "one-away" computers handle bingo cards needing one more hit; "two-away" computers handle cards needing two hits. The computers in the network also generate statistics on the progress of bingo cards toward wining patterns. These reports can be collated to develop overall statistics for any game in progress; in addition, the computer system broadcasts personal information, or live audio or video, of winning or close-to-winning players. The winning pattern for any game can be changed in real-time, as desired to continue interest in the game.

24 Claims, 11 Drawing Sheets

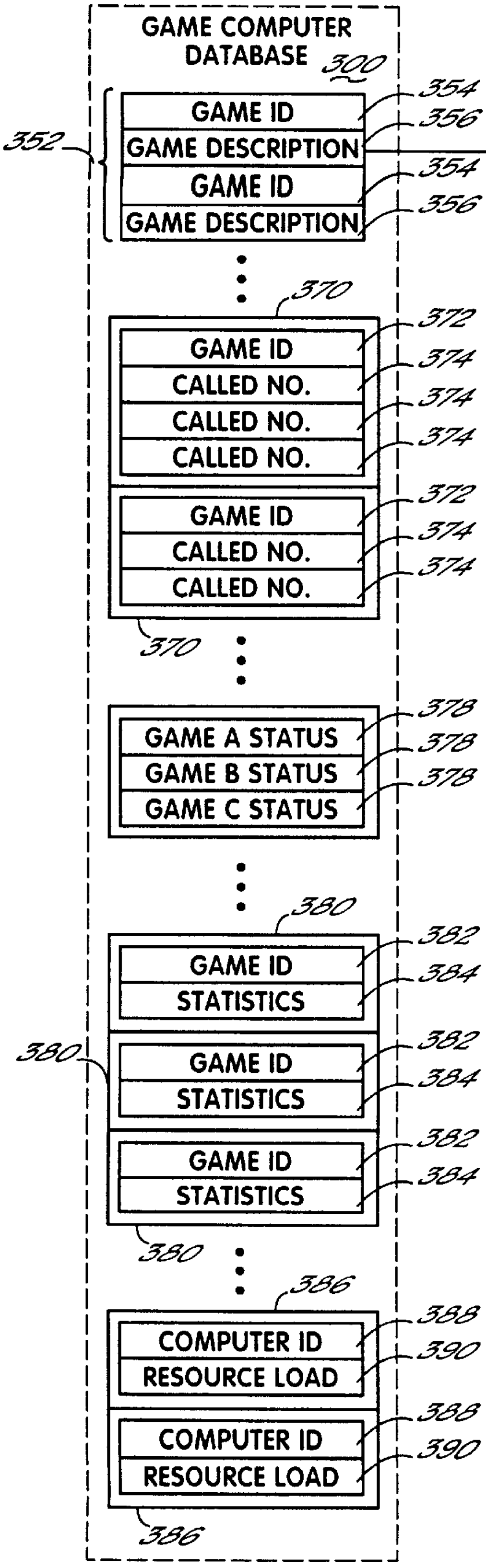
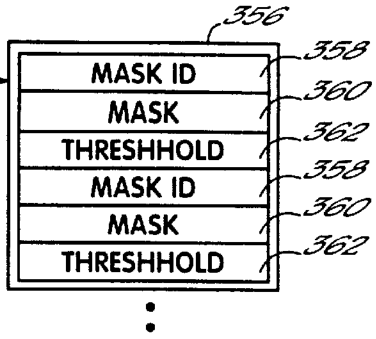
FIG. 6B
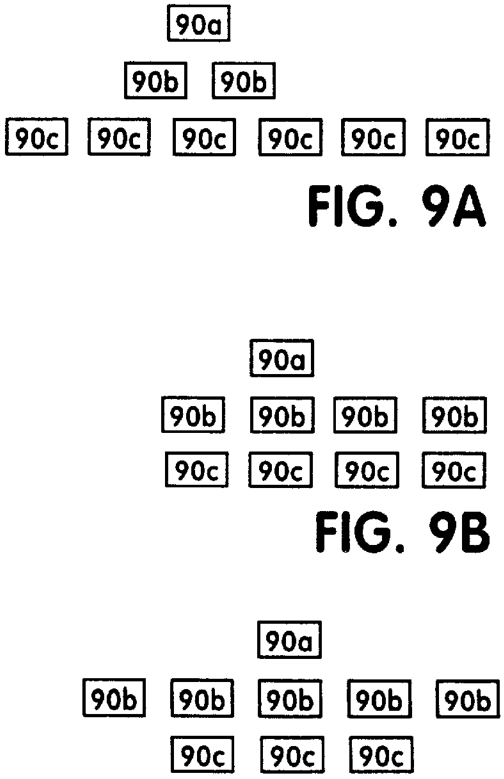
FIG. 9A
FIG. 9B
FIG. 9C

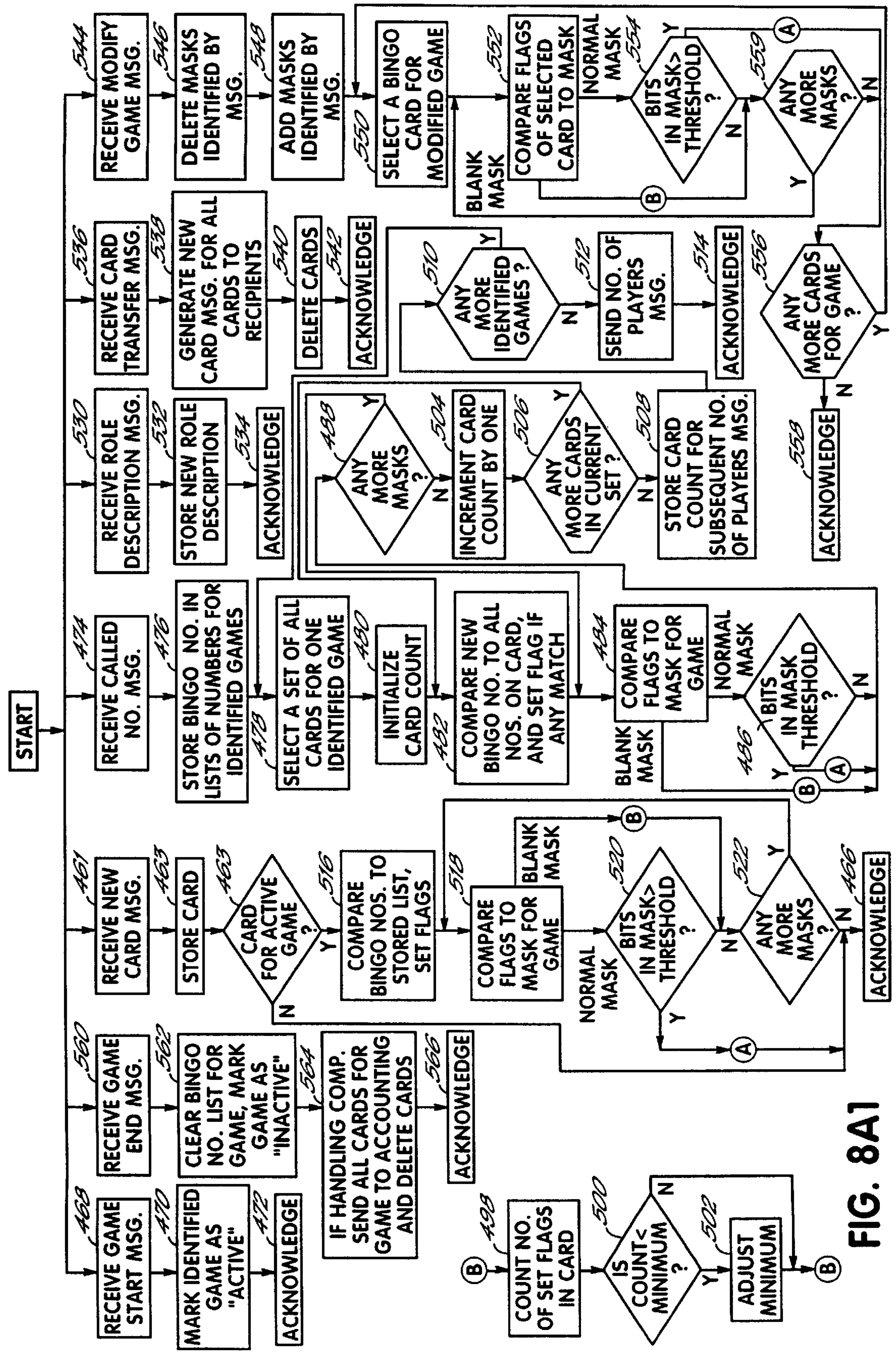
FIG. 8A1

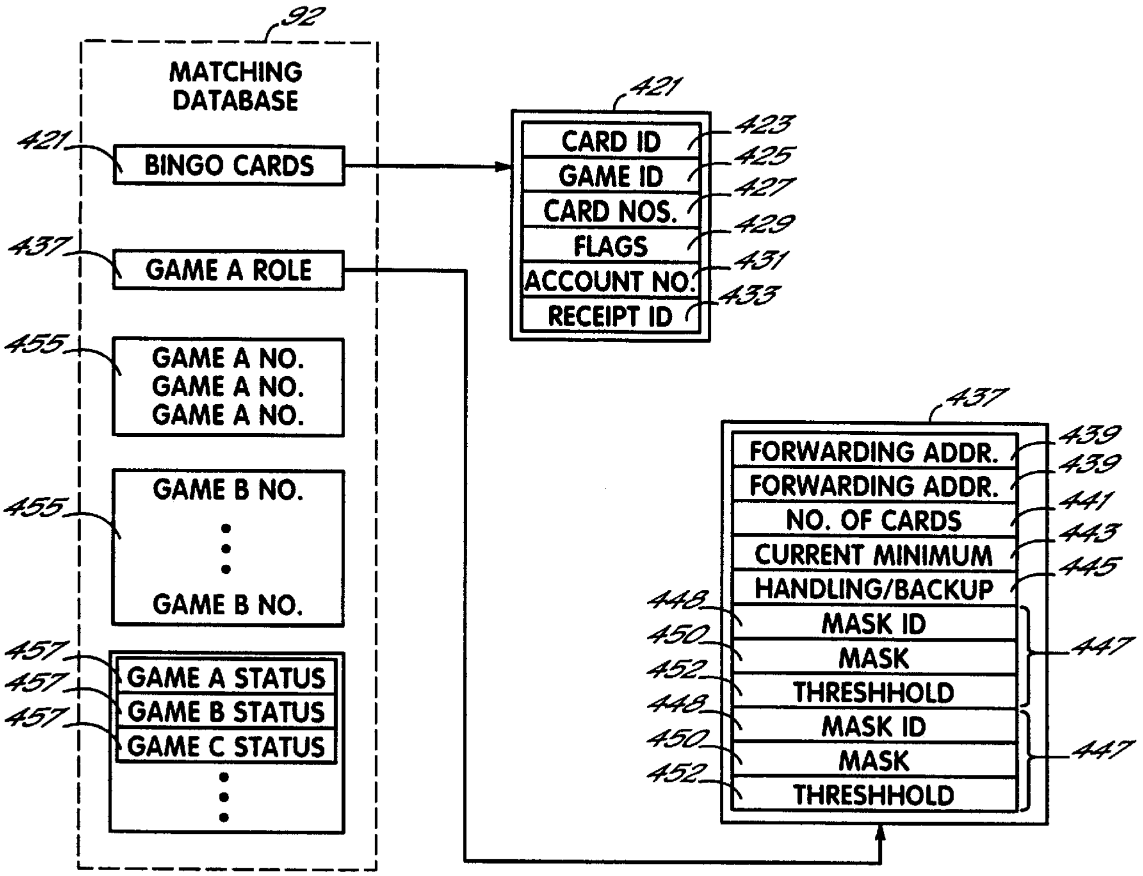
FIG. 8B
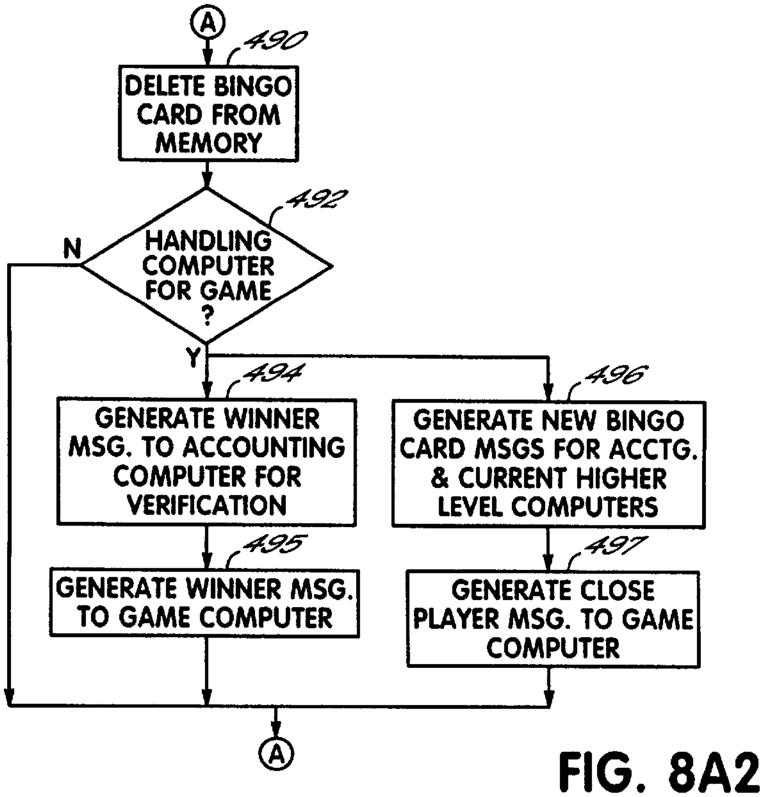
FIG. 8A2

COMPUTER NETWORK MANAGEMENT OF WIDE-AREA MULTI-PLAYER BINGO GAME

FIELD OF THE INVENTION

The present invention relates to computer systems for management of multi-player bingo games over a wide geographic area.

BACKGROUND OF THE INVENTION

Recently, gaming has become a popular form of adult entertainment. One form of gaming is the various state-sponsored lotteries. Furthermore, casinos have appeared throughout the country, and are popular gathering places for entertainment. Gaming has also become prevalent on the Internet, with many Internet servers providing virtual casino table games as well as other forms of gaming such as lotteries to on-line participants. Internet gaming in particular is expected to accelerate as Internet usage becomes more prevalent.

One of the most popular forms of gaming is known as "bingo". In the game of "bingo", each player receives a "bingo card", which in a traditional form of bingo, is a pre-printed card. The card contains a matrix of locations or "spaces", each space being associated with a "bingo number", typically printed in the associated space on the bingo card. As one example, a typical bingo card has a matrix of five rows and five columns of spaces, each space having a bingo number printed therein As the bingo game is played, bingo numbers are drawn at random and "called", i.e., delivered to all of the players. If a called number matches any of the numbers on a player's card, i.e., is a "hit", the player marks the space with that number. In order to win a bingo game, a player must achieve a predetermined winning pattern of hits (i.e., marked spaces) on his/her bingo card. (In many versions of bingo, the bingo cards have one or more "free" spaces, which are pre-marked and do not have a number. A free space can form part of a wining pattern without being hit by any of the called bingo numbers.)

Each game of bingo can have one or more winning patterns, as determined by the game's administrator (i.e., master of ceremonies or MC). The MC typically announces the winning pattern prior to commencement of the game. For example, in a typical game utilizing five-by-five bingo cards, the MC might announce that the winning pattern consists of hits in all five spaces in one row or column of the bingo card, or all five spaces in one of the two main diagonals of a bingo card. In another game, the MC might announce that the winning pattern consists of hits in all four corner spaces of a bingo card. It is also known to adopt progressive winning patterns for a bingo game. For example, once a player achieves hits all four comer spaces of a bingo card and collects a prize for that pattern, the game may continue until a player achieves hits the entire outside border of a bingo card, at which time a second prize will be awarded. Progressive winning patterns of this kind are typically announced in advance, but in some cases are announced by the MC as a game progresses, as appears appropriate to maintain interest of the players in the game.

A traditional bingo game is typically played in a single location (a "bingo hall") without use of communications devices. In this traditional arrangement, players enter the game by selecting a favored bingo card from an available group, and deliver payment for the game, and take a seat in the hall. Thereafter, the player monitors called numbers and marks his/her card(s). It is a typical rule that as soon as a player achieves a winning pattern of hits, the player must call out "bingo"; a player only capitalizes on his/her winning pattern by recognizing the pattern and calling "bingo". This rule encourages active attention to the game by the players in the hall. When the player announces "bingo", the player's card is compared to the called numbers to confirm that the player has won A disadvantage of the traditional bingo game, is that participants can find it draining to concentrate on the game with the intensity and for the period of time needed to ensure that bingo numbers are not missed and winning patterns are recognized. To alleviate this problem, several patents have proposed the use of portable computing devices for aiding in bingo play, such as the devices shown by U.S. Pat. Nos. 5,007,649 and 5,043,887 of Richardson and U.S. Pat. No. 4,768,151 of Birenbaum. These portable devices incorporate computing circuitry for matching drawn bingo numbers to bingo cards entered into the device, and issue alarms when a winning pattern of hits has been achieved.

It has also been proposed that bingo can be played over a wide area, by players potentially remote from the location at which the bingo numbers are being drawn and announced. Remote players would then use communications devices of one form or another to follow and participate in the game.

One difficulty that arises in administration of a wide-area bingo game, is the need to distribute bingo cards to the widely dispersed potential players. There are two approaches that have been proposed, each of which has advantages and disadvantages. U.S. Pat. Nos. 4,909,516 and 5,297,802 propose similar schemes in which bingo cards are printed at a central location and distributed manually to potential retail locations. Customers travel to these retail locations, select a bingo card, and then dial into the central location to enroll in an upcoming game. An identifier on the card is used to log the numbers on the card into the central system. An advantage of this approach is that the player's experience with the game is similar to a bingo hall; the player has a selection of cards to choose from, and may select a card with numbers that seem "lucky" or relevant to the particular person. A disadvantage, however, is that the retail locations may run out of cards, and must be persuaded to inventory cards in anticipation of forthcoming purchases. Furthermore, the expense of specially pre-printing and distributing a large number of cards can be prohibitive.

U.S. Pat. No. 5,351,970 describes an alternate approach. In the system described by that patent, customers travel to retail locations having state lottery machines. The customer delivers payment for a bingo card, and in response, the retailer uploads a bingo card request to the central lottery server. In reply, a bingo card is delivered to the lottery machine and printed for the customer. An advantage of this approach is that there is no need to pre-print cards or distribute them, or to convince retailers to stockpile the cards. A disadvantage, however, is that players have no opportunity to choose from among a number of bingo cards, or select a card with numbers that seem "lucky" or relevant to the particular person. Furthermore, there is no opportunity to re-use a bingo card if the player perceives it to be "lucky".

Another difficulty that arises in wide-area bingo games, is the need to determine when a player has won the game. In some of the proposed wide-area systems, players use interactive communications devices, which are configured to convey a "bingo" announcement from the remote player to the location in which the game is being played, so that the players are enabled to announce a wining status of their card, and can be required to do so to capitalize on the winning status of a card. In other proposals, a computer at the central location tracks the status of all bingo cards in play, and determines unilaterally when a player's card has achieved a winning pattern of hits, without involvement by the player. In a third approach, client computers at the location of each player, match called bingo numbers generated by the a server computer, to each of the player's bingo cards.

Automatic tracking of the status of all bingo cards in play has inherent advantages. In particular, when bingo card status is automatically tracked, it is not necessary for players to give active attention to the called bingo numbers, in order to win the game. This makes the bingo game similar to the popular state lotteries, which are popular in part because players do not need to watch or react to the real-time drawing of winning numbers to participate in and win the game, and because players do not need to coordinate their schedules with the schedule of the number drawing. Furthermore, when bingo card status is automatically tracked, players are not required to communicate anything to capitalize on a winning bingo card; thus, players do not need to use wide-area communications links to capitalize on a winning card, and need not rely on the speed and availability of a communication link in order to be ensured of winning the game. Finally, centralized tracking reduces the potential for fraud, as compared to systems in which client computers under the players' control match numbers to cards.

Various processes for centralized tracking and matching of bingo numbers to bingo cards are known in the art. Examples of known processes can be found in U.S. Pat. Nos. 5,297,802, 4,909,516, 4,661,906 and 4,651,995. Unfortunately, these known processes have a number of difficulties. Specifically, the task of centralized tracking is computationally intensive, and as a result all known processes have a practical limit on the number of players that can participate in the game. For the purpose of public interest and confidence in the game, it is desirable that the bingo numbers be announced in real time as they are selected (rather than being pre-selected in advance), and that there be no substantial delay between numbers. This means that the process for tracking and matching of bingo cards must operate in real time. However, to properly track and match bingo cards in real time, the computing system must identify, in real time, after each bingo number is called and before the next number is called, any card that achieves a winning pattern as a result of the last called bingo number. This criterion must be met to ensure that the game is appropriately stopped when a card reaches a winning pattern of hits. If, when the wining player achieves the winning pattern as a result of a bingo number being called, the fact of the winning pattern is not recognized until after one or more further bingo numbers are called, those further bingo numbers may lead one or more additional players to believe they have won the game. In this situation, the game administrator must select one of two undesirable approaches: refuse to pay out the prize to the additional players (which would likely generate ill will toward the administrator), or pay out prizes to the additional players even though those players did not actually win the game (in which case the total pay out may render the game unprofitable). To avoid such undesirable choices, the computer performing the bingo card matching process must be able to match bingo cards in real-time, and to complete the matching of a called number to all bingo cards, within the brief space of time between bingo numbers being called. Unfortunately, the computational complexity of the matching task increases with the number of bingo cards in the game; this means that known bingo card matching processes such as those described in the above-referenced patents have a practical limit on the number of bingo cards that can be played in a particular game.

Thus, it is an object of the present invention to overcome the above difficulties experienced in the prior art, by providing a computer system for administrating a wide-area bingo game, which provides features for enhancing the reliability and excitement of the game, while ensuring that the bingo game is entirely fair. The result is a game of pure chance rather than skill (thus, identical in this respect to conventional lotteries) but which uses a more entertaining and exciting methodology for determining winners than current state-sponsored number-draw lotteries.

SUMMARY OF THE INVENTION

In accordance with principles of the present invention, this difficulty is overcome by utilizing a computer network to compare bingo numbers to a large number of bingo cards Specifically, the network includes at least two computers, each of which stores an electronic representation of bingo cards from an ongoing, real-time bingo game. As each bingo number is called as part of the real-time bingo game, the bingo number is delivered to all computers in the network, and the computers simultaneously and in parallel compare the called numbers to those bingo cards stored in each respective computer. When a computer identifies a bingo card that has achieved a predetermined pattern of marked locations, the computer signals this event, so that the bingo game can be halted before an additional number is drawn. This computer-network approach is of particular advantage, because, in accordance with principles of the invention, the network can be expanded to whatever size is necessary to provide the needed computational power to ensure that bingo card matching is performed in real time as bingo numbers are drawn.

In specific embodiments of the invention disclosed herein, a bingo card is distributed to one of the computers in the network in accordance with number of hits needed for the card to reach a winning pattern. Thus, for example, one or more "one-away" computers in the network match called bingo numbers to bingo cards needing only one more hit to reach a winning pattern. One or more additional "two-away" computers in the network are allocated cards needing two hits to achieve a winning pattern. These "two-away" computers forward a bingo card to the "one-away" computer(s) when the bingo card reaches a state where the card is only one hit away from reaching a winning pattern. Additional "far away" computers in the network are allocated cards needing three or more hits to achieve a winning pattern; these computers forward a bingo card to the "two-away" computer(s) when the bingo card reaches a state where the card is two hits away from reaching a winning pattern.

A particular advantage of this approach is that it distributes the computational burdens inherent in matching bingo numbers to bingo cards, across an array of computers, so that the computational capacity of the system is enhanced to handle large numbers of bingo cards. Furthermore, the system can be infinitely expanded to support an essentially infinite load of bingo cards, by incorporating computers into the appropriate level of the network.

It will also be noted that the approach of distributing cards throughout the network speeds the decision-making process. Specifically, once the "one-away" computer(s) has(have) examined all of its(their) allocated bingo cards, it can be known to a certainty that no cards have achieved a winning pattern as a result of the most-recently-announced bingo number. Since the "one-away" computer(s) is(are) not likely to contain large numbers of bingo cards, this means that it can be known fairly rapidly whether any player has won the game as the result of a called bingo number. This ensures that the game will be halted in time to prevent further bingo numbers from being called, and also makes the computational process relatively transparent to the viewers of the game.

Another aspect of the invention, which is made possible by the use of a computer network as described above, is provisions for resource leveling and fault tolerance. Specifically, computers in the network can be assigned "backup" roles, so that, if a computer goes down during a game, the fault can be recognized and the associated tasks switched to other computers in the network. Also, computers can be reassigned new roles as the computational load changes.

A third aspect of the invention, is that the computer system generates statistics on the bingo cards playing in the game. Specifically, after each computer in the network completes matching drawn numbers to bingo cards, the computer delivers a report indicating the number of bingo cards remaining in that computer, as well as the least number of hits on any cards in the computer. These reports can be collated to develop overall statistics for the game in progress, identifying the number of players who are one, two, or any arbitrary number of hits from a winning combination Furthermore, the statistics on the least number of hits in cards, can be used in connection with a "leaster" game, where a prize is awarded to the player(s) having the fewest hits, when the game ends due to another player's "bingo". The resulting statistics can be delivered to players of the game in real time, as the game is being played, thus adding to the excitement of the game. Players tracking their own bingo cards against called numbers, will know immediately, and exactly whether their card's progress toward a winning combination is similar to, ahead of, or behind the other players. Comparative information of this kind is simply unavailable in traditional forms of bingo, and may add to the appeal of the game.

In specific embodiments of this aspect of the invention, the computer system can deliver additional information beyond statistics on player status. For example, the computer system can retrieve information on players who are only one number away from a winning pattern, and announce this information as part of the bingo game coverage. For example, the location where the close card was purchased could be announced, giving all players who make purchases at that location an enhanced sense of participation in the game. Alternatively, or in addition, an audio or video connection might be made to players or player locations for a brief conversation. If the player is located in a bingo hall, this might be identified in the computer system and used to make a telephone call to that location, or used to activate a pre-existing live video connection showing the hall where the close player is residing. Alternatively, telephone numbers might be obtained from the computer system and used to contact the retailer where the card was sold, or the player him/herself.

A further aspect of the present invention, is that the computer system permits the MC to change the winning pattern for a bingo game in real-time, as desired while the game is being played. As a result of the computational power of the computer system, the bingo cards and the marked spaces on cards, can be stored and manipulated in a complete, uncompressed form. This permits the computer system to alter the winning patterns in mid-game, without requiring the previously called numbers to be re-compared to the cards.

In specific embodiments, the computer system may be programmed to modify a game based on a number of bingo numbers drawn for a game, or whether a previous version of the game has been won by a bingo player.

An additional aspect of the present invention, is provision for double verification of winning cards, to ensure that winners are not erroneously identified as a result of a computer error or fraud. Specifically, two copies of each bingo card are maintained; one copy is maintained in an accounting database while the second copy is passed through the matching process. When the matching process indicates that a bingo card is a winning card, the corresponding card is retrieved from the accounting database and independently compared to all of the called numbers. Only if this double check also indicates that the card is a winning card, is the winner validated and a pay out made. Thus, if through computer error or fraud, either the accounting database or the card stored by the matching process is altered, the alteration will not lead to an erroneous pay out.

A further aspect of the present invention, is the ability of the computer system to match bingo numbers to multiple sets of cards participating in multiple simultaneous bingo games. Specifically, called numbers are matched to cards participating in two or more separate, potentially simultaneous bingo games. This aspect of the present invention allows a single bingo number matching facility to be used by multiple wide-area bingo games using one or more number calling facilities.

In specific embodiments, the multiple simultaneous games may begin and end at different times, may have different rules (e.g., card size, card numbers). Called numbers may be applicable to one, many, or all of the simultaneous bingo games. As one specific example, a multi-state "power bingo" game might be performed simultaneously with one or more individual state-wide bingo games. The "power bingo" game might have a larger range of numbers, or larger bingo cards, than the statewide games, decreasing the odds of winning to account for the larger number of players participating in the game. Then, during the daily broadcast of the bingo number drawing, "power bingo" numbers can be interspersed with state-game bingo numbers, engaging a wider audience in the drawing.

An additional aspect of the invention, is the ability of a player to participate in the bingo game by validating a bingo card received from a number of possible sources. Specifically, pre-printed bingo cards are distributed electronically to public locations, in advance of the game, for example through lottery networks to lottery machines, through ATM networks to ATMs, or by printing bingo cards in available spaces on instant lottery game pieces. Distributing pre-printed cards through these channels eliminates the expense associated with special pre-printing and manual distribution of pre-printed cards, while at the same time, allowing potential players to review a number of possible cards before selecting a preferred card for participating in a bingo game A player, having chosen a preferred a pre-printed card, can then validate the card to participate in a bingo game by submitting payment for the game, and the identifier of the card (which may be typed or bar-coded onto the pre-printed card). The bingo card will then be included in the pool of cards for the selected game. Subsequently, the player can discard the card, or revalidate the card for another game by a similar process. Thus, a player can participate in any number of games using a favorite pre-printed bingo card.

The above and other objects and advantages of the present invention shall be made apparent from the accompanying drawings and the description thereof

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 6B is a data structure diagram illustrating the data structures stored and maintained as part of the game process;

FIGS. 8A-1 and 8A-2 are flow charts illustrating the process performed by the matching computers of the computer network of FIG. 3, and FIG. 8B is a data structure diagram illustrating the data structures stored and maintained as part of the matching process; and FIGS. 9A, 9B and 9C are schematic diagrams illustrating the configuration of the matching computers in the network of FIG. 3 as a particular bingo game progresses, illustrating the re-distribution of computing resources to needed locations as the game progresses.

DETAILED DESCRIPTION OF SPECIFIC EMBODIMENTS

Figure 1:
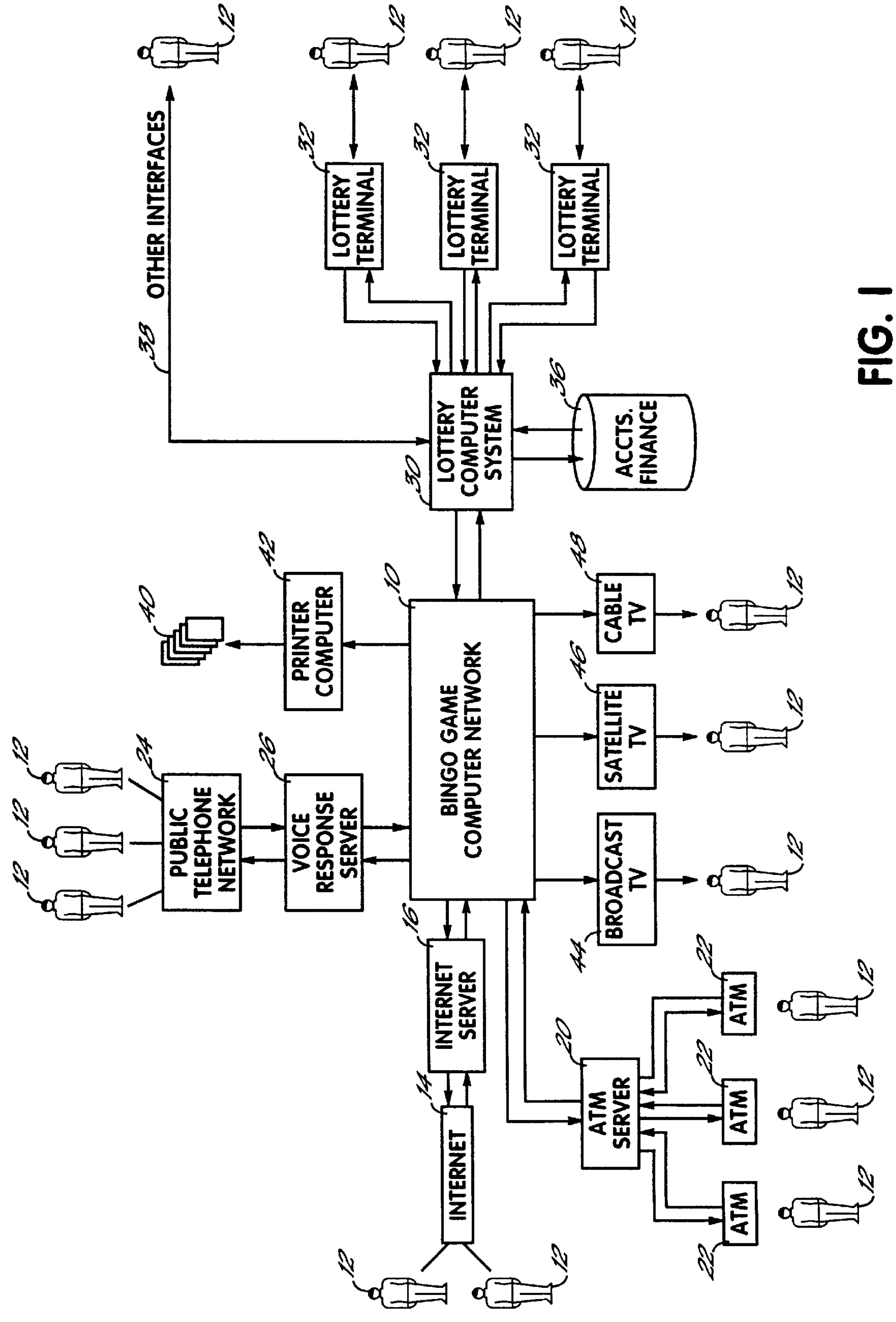
FIG. 1 is an overall block diagram of a bingo game management computer networks in accordance with principles of the present invention, showing connections from and to the network used by players in entering games and viewing ongoing games.

Referring to FIG. 1, the organization and use of a bingo game computer network 10 can be described. Computer network 10 is the central processing system for administration of a computerized bingo game. Players 12 interact with the computerized bingo game through a number of possible connections.

Firstly, players 12 may communicate through the Internet 14 via an Internet server 16 operating within the computer network 10. Internet communications may be in the form of HTML formatted pages using the Internet HTTP (World Wide Web) transfer protocol, or alternatively may be files transferred under FTP protocols or may be terminal interactions using Internet TELNET protocols. Internet server 16 is responsible for handling all communications via the Internet 14 with players 12. The specific actions that payers 12 may take in interacting with Internet server 16 are discussed below in connection with FIG. 2.

Players 12 may further interact with computer network 10 via an automated teller machine (ATM) network. Specifically, an automated teller machine network server 20 is in communication with computer network 10. Server 20 uses secure communication links to communicate with a plurality of automated teller machines (ATMs) 22 which may be accessed by players 12 at local banking establishments and other retail locations. Automated teller machines include relatively sophisticated programmable circuitry for performing automated teller transactions such as bank account inquiries, deposits and withdrawals. Automated teller machines 22 may be easily reprogrammed to permit the sales and redemption of bingo cards in the manner discussed below with reference to FIG. 2.

Players 12 may further interact with computer network 10 via the public switched telephone network 24. Computer network 10 includes a voice response server 26 which can be accessed via the telephone network 24 by players 12 at conventional telephone terminals. Using touch tone or voiced commands, remote players 12 may interact with voice response server 26 to participate in a bingo game in the manner discussed below with reference to FIG. 2.

In addition to the foregoing, computer network 10 is interconnected with and communicates with a lottery computer system 30. Lottery computer system 30 may be any of the state lottery management systems used by the various states of the United States or foreign governments and/or private lottery computer systems used to manage a private lottery. State lotteries typically utilize secure communications links for communication between a central lottery computer system and a plurality of lottery terminals 32 located at retail establishments. Players 12 typically visit a retail establishment and use the lottery terminal 32 to purchase lottery tickets. In accordance with principles of the present invention, players 12 will also use lottery terminals 32 to purchase bingo game cards, and/or to validate previously purchased or obtained bingo cards. Lottery computer system 30 further includes functions for maintaining an accounting and financial database 36 to track the sales of lottery game pieces and payouts of winnings by establishing player accounts and/or retail accounts to be debited and credited as games are played by players 12. This accounting and financial system, and the database 36, may also be used by bingo computer network 10 in performing financial operations for the bingo game administered by bingo game computer network 10. Lottery computer system 30 may also provide other interfaces 38, such as telephone interfaces or other methods by which a player 12 may enter a lottery game or redeem winnings in a lottery game. These interfaces 38 also be used by the bingo game managed by bingo game computer network 10 to provide a bingo game to players 12.

As may be appreciated from the following discussion, in one embodiment of the present invention, players 12 are suppled with playing pieces (i.e., bingo cards) 40 for participating in bingo games by manual distribution of these playing pieces to players 12. In these embodiments, bingo game computer network 10 may be connected to a printer computer system 42, which may be a computer system at a commercial printing shop which produces lottery playing pieces, or may be a newspaper computer system which produces newspaper inserts. In either case, descriptions of bingo cards to be distributed to the public are delivered to printer computer 42 and then used to generate printed bingo cards 40. As one example, bingo cards may be printed on a rear face of a instant win ticket of the kind currently used by state lotteries. Alternatively, bingo cards 40 may be distributed to the public by newspapers or magazines for use in playing bingo games.

During a bingo game, bingo game computer network 10 delivers information on the ongoing bingo game through various possible media. Information on numbers called during the bingo games can be delivered to players 12 through any one of the mechanisms described above, i.e., via computer generated voice descriptions of call numbers produced by voice response server 26, by delivery of electronic descriptions via Internet server 16, via ATM network computer 20, or by through lottery computer system 30. Furthermore, information on the ongoing bingo game may be delivered to users via a number of TV connections. For example, bingo game computer network 10 may generate a television signal, which is delivered via a broadcast TV station 44 and received by players 12 using standard television receivers, or delivered via satellite TV stations 46 for reception via satellite receivers, or delivered via cable television stations 48 for reception over cable connections. Also, a live audience may witness the bingo game live in a television studio or other gaming location or may witness a closed circuit broadcast of the game via cable television.

Figure 2:
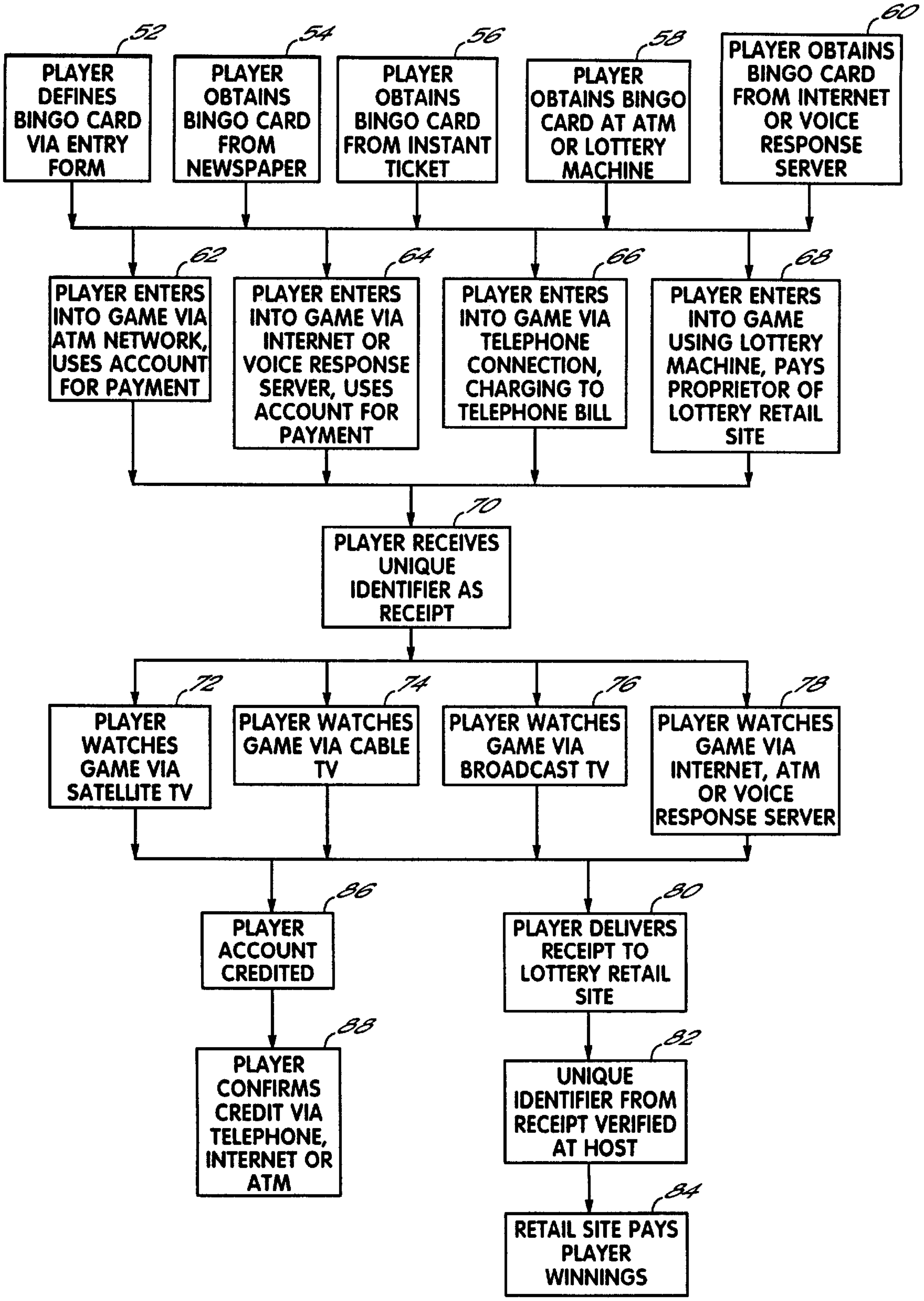
FIG. 2 is a flow chart illustrating the process by which a bingo player interacts with the network of FIG. 1 to enter, view, and collect winnings from a bingo game.

Referring now to FIG. 2, the process used by a player participating in a bingo game using the various interfaces to bingo game computer network 10 of FIG. 1 can be described. As an initial step in playing a bingo game, a player 12 obtains a bingo card 40. This may be done in a number of ways as indicated above. Particularly, a player may define 52 a bingo card, or may obtain a predefined card. In many applications, players do not define their own bingo cards, but rather obtain a preprinted or randomly generated bingo card from bingo game computer network 10. However, it is possible for players to define their own bingo cards using entry forms inserted into lottery terminal 32, by interacting with Internet server 16, or potentially by entering number for a bingo card into an automated teller machine 22 or by entering these numbers in the voice response server 26.

If the player does not define the card, the player may obtain 54 a preprinted bingo card from a newspaper, or obtain 56 a preprinted bingo card from an instant lottery ticket. Also, a player may obtain 58 a randomly-selected bingo card at an automated teller or lottery machine by requesting automatic generation of the bingo card. Finally, the player may obtain 60 a randomly-selected bingo card from the Internet server 16 via the Internet 14 or from voice response server 26 via the public telephone network 24.

Players may have access to a number of preprinted bingo cards or a number of choices of randomly generated bingo cards. For example, a player may have a newspaper page or multiple newspapers containing multiple bingo cards that can be used in a bingo game on bingo game computer network 10. Players may also have multiple instant tickets bearing pre-printed bingo cards. Players are free to choose a bingo card which is particularly appealing from the multiple numbers of bingo cards available to them. Similarly, a player receiving a randomly generated bingo card from a lottery terminal, an ATM machine 22 or Internet server 16 or voice response server 26, may elect to reject a bingo card which does not appeal to the player. Thus, in accordance with the principles of the present invention, bingo players may choose bingo cards which appeal to the player for the reason of having certain favored numbers or numbers perceived to by lucky. The methods described below for enrolling a bingo card in a bingo game permit players to choose their own bingo cards or at least to choose bingo cards from a selection of available cards to thereby increase player interest in the game.

Once a player has obtained a bingo card of interest, the player enters into the bingo game through one of a number of possible steps. Specifically, the player may enter 62 into the game using the automated teller machine network via an automated teller machine 22. In such a circumstance, the player will pay for entering the game using an account, typically a bank account or perhaps a credit card account number. Automated teller networks are particularly suited for transferring and obtaining financial data of this kind. Alternatively, players may enter 64 into the bingo game using the Internet server 16 or voice response server 26. In either case, the player uses an account number to pay for entry into the game. The account number may be a credit card account number or may be a preestablished deposit account into which the player has previously paid a deposit amount for future charges. Players may also establish credit lines with the authority managing the bingo game; in this approach, the player would receive a periodic bill for charges accrued during the previous period.

In another approach, the player may enter 66 into the game using the telephone voice response server 26 by dialing a 900 or 976 number so that the fees for entering the game are charged to the users telephone bill and the telephone company credits the administrator of the bingo game computer network 10 for the charges applied to the consumer. In this approach, the consumer's preexisting relationship with the telephone company is used as the mechanism for payment for bingo game entries. Finally, the player may enter 68 into the game using a lottery terminal 32 in which case player 12 typically pays the proprietor of the retail site where the lottery terminal 32 is located. The lottery computer system 30 then stores in the data base 36 an indication that the retail proprietor owes a percentage of this entry amount to the lottery administrator. This last approach for entering the bingo game is most similar to the methods used by various known state lotteries to enter players.

After the player has delivered payment for entering into the bingo game, the player then receives 70 a receipt for the entry, typically including an identification number or alphanumeric code. The identification number may be delivered by computer generated voiced utterances from voice response server 26, may be printed on a receipt by an ATM or lottery terminal, or may be delivered in electronic form by Internet server 16. The identifier delivered to the player may be a number having a specific fixed relationship to the numbers on the bingo card entered into the game by the player. Alternatively, the identifier may have no relationship to the bingo card numbers. In either case, the identifier and the bingo card numbers are stored on bingo game computer network 10 in the manner discussed below, and may be used to verify the authenticity of a winning bingo card. The identifier may also be used as a shorthand for the numbers on the winning bingo card, so that, for example, a player seeking to determine the status of their bingo card, may connect to voice response server 26, enter the identification number for the card via touch-tone dialing, and receive an indication of the status of their bingo cards. This is clearly preferable to having to enter all of the numbers on the bingo card to identify the card.

One particularly advantageous use of bingo card identifying numbers is in facilitating entry of players into a bingo game. Specifically, bingo cards 40 which are preprinted in newspaper supplements or on the reverse side of instant game tickets, may be associated with identifiers so that a player having a preprinted bingo card may simply dial in via a public telephone network 24 to voice response server 26, or connect through the ATM network 20 or through lottery computer system 30 or the Internet server 16, deliver the identifier for the preprinted bingo card, and be immediately entered into the desired bingo game to use that bingo card. Under this approach, bingo cards may be used multiple times if the bingo card is favored by a player, or a player may obtain a new bingo card each time the player wishes to enter a bingo game. Distribution of preprinted bingo cards is expected to enhance the visibility of the bingo game and promote sales of the bingo game particularly when the game is initially introduced. Furthermore, when bingo cards are preprinted on instant win tickets that are distributed currently by state lotteries, the instant win game may be readily used to advertise and encourage participation in the bingo game. For example, one type of winning instant win ticket may give the holder a free entry into the bingo game using the bingo card numbers printed on the instant win tickets. Multiple bingo card numbers may also be printed on single instant win ticket, giving a player a choice of multiple possible entries with the same instant win ticket.

It will be appreciated that, as a general proposition, the pre-printed bingo cards may also be pre-paid, in that no additional fee is required to enter the game. Thus, for example, bingo cards may be sold in the same manner as instant win tickets, with payment made for receipt of the ticket. A bingo player may then carry the instant win ticket in a purse or wallet for a number of days before deciding to participate in a bingo game. Then, to participate in the game, the player need only dial into voice response server 16, deliver the identifier for the card, and will be enrolled in the game. A similar principle could be used to sell entries in other forms of lotteries.

Once a player has entered the game and received a receipt number, and/or a printed receipt for the player's entry, the player will then participate in the game by watching the drawing of bingo numbers. The player may view the drawing of bingo numbers a number of ways as discussed above. For example, the player may watch 72 the game via satellite television using a satellite television receiver at the players home or at a local bar or restaurant. The player may also watch 74 the game via cable television using a cable television connection at a residence, bar or restaurant or at a bingo hall. Further, the player may watch 76 the games via broadcast television using a conventional television receiver at any of the above locations. Finally, the player may watch 78 the game by receiving updates on called numbers via an Internet service such as a TELNET protocol service or a HTTP (World Wide Web) protocol service using "JAVA" applets, or other interactive Internet services. The player may also watch the game via the public telephone network by connecting to the voice response server 26, to receive voiced indications of called numbers, or by connecting to ATM server 20 via an automated teller machine 22 and receiving updates on called numbers in this manner.

After watching a bingo game, a player may determine that the player has won a prize or payout in the bingo game. If this occurs, the player may redeem the prize or payout in one of a number of ways using the communications connections shown in FIG. 1. Specifically, the player may travel to a lottery retail site and deliver 80 their previously received an identifier and/or receipt to the lottery retailer. In this case, the retailer uses the identifier of the receipt to verify 82 the winning status of the players bingo card by communicating with the lottery computer system, which in turn communicates with computer network 10. After thus verifying the winning status of the players card, the retail site pays out the player's winnings 84.

An alternative process uses on-line accounts as described above. Specifically, the player's account is automatically credited 86 with a payout when the bingo game computer network 10 determines if the player has won a payout. A player may then subsequently confirm 88 that the player's account has been credited, using the public telephone network 24 connected to the voice response server 26, or using the Internet 14 and Internet server 16, or using an ATM 22 and ATM server 20.

Figure 3:
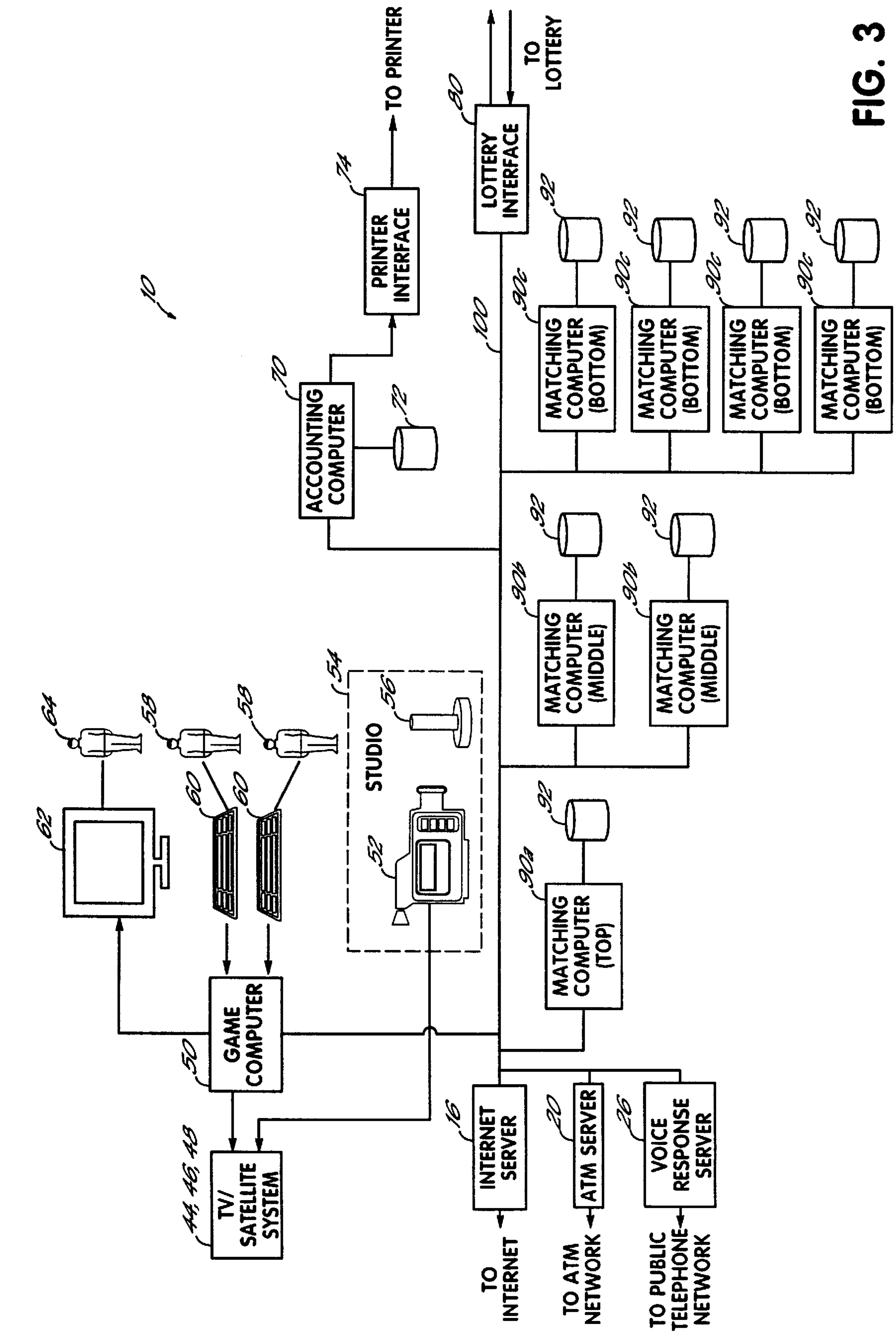
FIG. 3 is a detailed block diagram of the computer network of FIG. 1, illustrating one embodiment of specific computers and their components for managing multiple simultaneous bingo games.

Referring now to FIG. 3, the internal structure of computer network 10 for bingo game management can be discussed in greater detail. Computer network 10 comprises a plurality of computers connected to each via a communications link 100. Link 100 may be a local area network using either TCP/IP, token ring or other local area network communication protocols, or may be a wide area network using leased telephone lines or Internet connections. In each case, communications link 100 supports communications between each of the various computers in computer network 10 on a real time basis in accordance with the methods discussed in the subsequent figures.

As seen in FIG. 3, communications link 100 permits communications between all of the computers comprising computer network 10. In particular, communication link 100 connects to Internet server 16 to permit communication from players over the Internet be delivered to any one of the computers in computer network 10. Further, communications link 100 connects to ATM server 20 to permit communications from ATM machines 22 (FIG. 1) to be routed to any computer of network 10. Finally, communications link 100 connects voice response server 26 to permit players interacting through the public telephone network with voice response server 26 to deliver data to any one of the computers in network 10.

At the heart of computer network 10 is a game computer 50 which performs overall control of the bingo game as the game is being played. As described below in considerably greater detail, game computer 50 broadcasts reports of called bingo numbers to other computers of computer network 10, and accumulates statistics on the status of players playing in the game for broadcast over television connections. For the latter purpose, game computer 50 is connected to the TV or satellite system 44, 46, 28 to permit statistics collected by game computer 50 to be displayed via television connections. Further, game computer 50 is connected to Internet server 16, ATM server 20 and voice response server 26 over communication link 100 to permit statistics or reports of called bingo numbers to be delivered from game computer 50 to players monitoring the game over the Internet, at an ATM machine or at a telephone using the public telephone network.

As noted above, statistics generated by game computer 50 are delivered to the TV or satellite system, 44, 46 or 48 for display on the screen. At the same time, live video of the game, as it is being played, produced by one or more television cameras 52 in a studio, may also be delivered to the TV or satellite system 44, 46 or 48 for display along with the statistics from game computer 50. In one particular embodiment illustrated schematically in FIG. 3, bingo numbers are drawn by a ball machine 56, which machine selects numbered ping pong balls from a pool of balls to generate randomly selected called numbers for the bingo game.

Camera 52 shows the numbers as they are selected by ball machine so that viewers of the game through the TV or satellite system 44, 46 or 48 can see the drawing of numbers. Simultaneously with each number being drawn, two key operators 58 enter the drawn number into keyboards 60 connected to game computer 50. Game computer 50 then determines whether the numbers entered by operators 58 match, and if so, displays the entered numbers on a monitor 62 for confirmation by a supervisor 64. When supervisor 64 confirms that the entered number is the number drawn by ball machine 56, game computer 50 broadcasts a message indicating the called number to all computers in the network 100 (computer network 10), as discussed in further detail below. In response to this message, computers in computer network 10 determine whether the called number matches any of the cards of the players currently enrolled in the bingo game. At the same time, the called number may be deliver to Internet server 16, ATM server 20 or voice response server 26, where it is converted into an Internet, ATM or voiced message to be delivered to all players connected and monitoring the game through servers 16, 20 or 26.

It will be appreciated that other enhancements to the game can be made to provide an exciting television presentation For example, players may be invited to call in to the ongoing program to chat live with the hosts or master of ceremonies regarding the game, in a manner similar to that used by televised shopping programs. Also, telephone calls or video may be originated from the studio where the game is being broadcast, in response to a player winning or coming close to winning the game, as is described in further detail below.

Computer network 10 also includes an accounting computer 70 responsible for tracing which bingo cards are in play in a particular game and tracking a reserve of bingo cards available for future games. This information is stored in the database 72 accessible to accounting computer 70. Accounting computer 70 is further responsible for delivering descriptions of bingo cards through a printer interface 74 for delivery to a printer to be printed in hard copy for the purposes of circulation in newspapers and/or instant tickets. Accounting computer 70 is connected to other computers in computer network 10 via communication link 100 to permit descriptions of the bingo cards in database 72 to be forwarded to other computers in computer network 10. For example, as described above, a player may enter into a bingo game through the Internet, ATM or telephone networks by connection to computer network 10 and requesting a bingo card. In such circumstances, accounting computer 70 retrieves an unused bingo card from database 72 and forwards the bingo card to the appropriate one of servers 16, 20 and 26 for delivery to the player. Specific details on this operation of computer network 10 and accounting computer 70 is provided below. Also, at the conclusion of a bingo game, records of all cards that participated in the game, and their status, are stored by accounting computer for archival purposes. Details on this operation will also be discussed below.

Computer network 10 further includes a lottery interface 80 for interacting with the lottery computer system 30 FIG. 1) to permit players interacting through lottery terminals to obtain bingo cards. Furthermore, in many applications lottery computer system 30 may be responsible for all financial accounting including establishment of player accounts and retail location accounts and management of financial transactions. In such a circumstance, computer network 10 communicates through lottery interface 80 to lottery computer system 30 to authorize financial transactions as part of the sale of bingo cards to players through Internet server 16, ATM server 20 and voice response server 26.

Within computer network 10 are a number of matching computers 90. Matching computers 90 are responsible for matching called bingo numbers to players' bingo cards to determine when and if a player has won or is close to winning an ongoing bingo game, as well as determine statistics on players participating in the bingo game. Specific details of these operations are described below in greater detail. Each matching computer 90 is associated with a database 92, into which the matching computer stores bingo cards of players playing the game as well as other information to be described in further detail below. (It will be appreciated that the database 92 may be stored in random access memory (RAM) in the matching computer, or on a mass storage device such as a hard disk, or both.

It will be appreciated from FIG. 3, as well as the following description including FIGS. 9A, 9B and 9C, that matching computers 90 divide the task of matching called bingo numbers to bingo cards, so as to perform the matching process in parallel with enhanced speed as compared to a single computer performing the entire matching process. Specifically, the bingo cards being matched for a particular game, are distributed among the matching computers, so that only one or a subset of the matching computers are responsible for matching called bingo numbers to any one bingo card. This distribution of the computational burden of matching bingo cards, makes the matching process robust and easily extensible for any number of bingo cards.

It will also be appreciated that distribution of the bingo cards among the matching computers 90, is such that one "top level" matching computer **90*a* is responsible for handling bingo cards of players close to achieving a winning pattern on a bingo card. A group of "midlevel" matching computers 90*b*, are responsible for handling bingo cards of players which are further from achieving a winning pattern than those bingo cards handled by computer 90*a*. A group of "bottom level" matching computers 90*c* are responsible for handling bingo cards and players that are even further from achieving a winning combination than bingo cards handled by computers 90*b***. (Three "levels" of matching computers are illustrated in the present embodiment, but other numbers of levels of matching computers, and other methods of dividing bingo cards among the computers, are also within the scope of the present invention.)

The roles of matching computers 90 can be configured and reconfigured by game computer 50 in a dynamic fashion, in the manner described below, to permit sufficient computing resources to be applied at various stages in the process of or more games so that as greater numbers of players come close to winning combinations on their bingo cards, matching computers 90 are reconfigured to handle matching of bingo numbers to these cards. Further details as to this operation will be discussed in detail below.

Figure 4A:
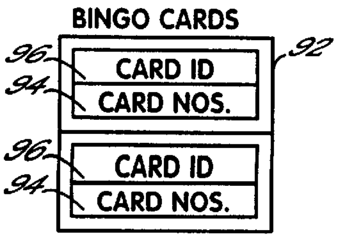
FIGS. 4A through 4N illustrate messages transferred between computers of the computer network illustrated in FIG. 3 as part of administering bingo games.
Figure 4B:
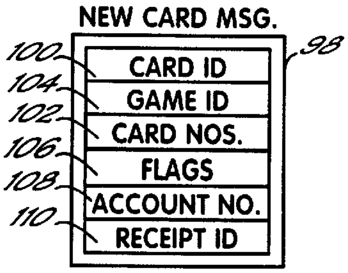
Figure 4C:
Figure 4D:
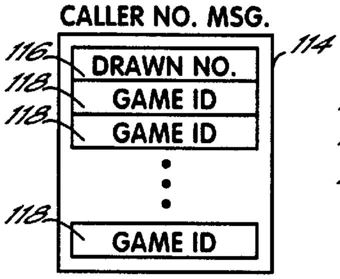
Figure 4E:
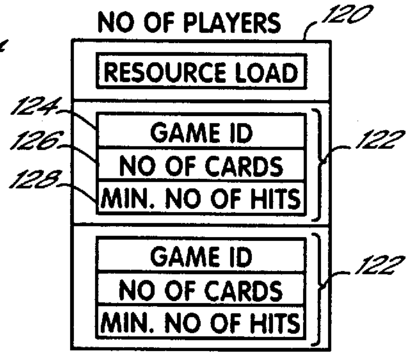
Figure 4F:
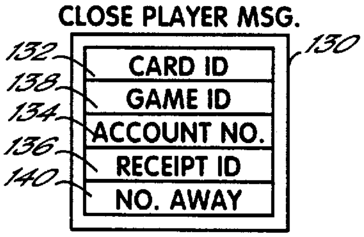
Figure 4G:
Figure 4H:
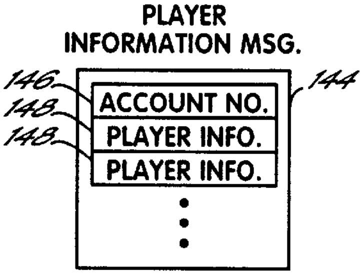
Figure 4I:
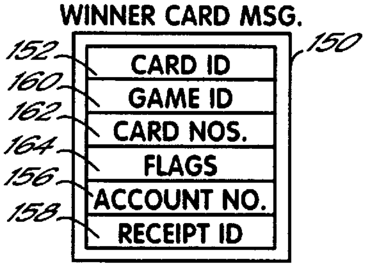
Figure 4J:
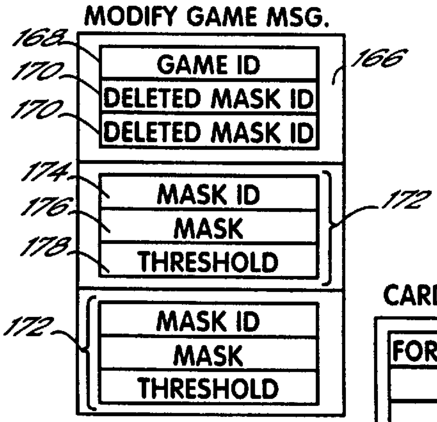
Figure 4K:
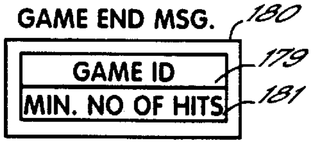
Figure 4L:
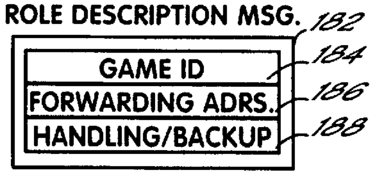
Figure 4M:
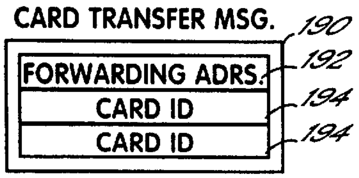
Figure 4N:
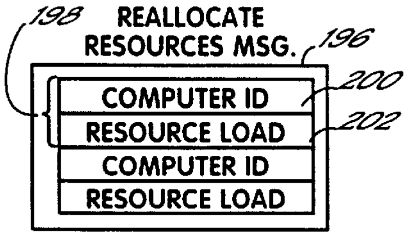

Referring now to FIG. 4A through FIG. 4N, details of the communications between the computers of network 10 illustrated in FIG. 3 can be described. The messages transmitted between various computers of network 10 will be described below in the approximate order in which the messages are used by a particular bingo game, although the specific use of messages is detailed best in the following figures which illustrated the processes performed by game computer 50, accounting computer 70 and matching computers 90.

Referring to FIG. 4A, a bingo cards message 92 identifies bingo cards to used in subsequent bingo games. Message 92 is generated by a bingo card generating computer (which may be the game or accounting computers, or another computer which is not shown) using one of number of known algorithms for generating random bingo cards. Bingo cards message 92 is delivered to accounting computer 70 for storage in database 72 for later delivery to players and to the matching computers 90. Bingo cards message 92 includes a number of entries each of which describes one bingo card. Two entries are shown in FIG. 4A, although in any implementation there may be any number of entries of this kind in given bingo cards message. Each entry in bingo cards message 92 includes a field 94 for storing binary encoded bingo card numbers, i.e., binary encoded identifications of the bingo numbers appearing on a bingo card. In addition, each entry includes a card identifier field 96, which stores an identifier used to identify the card in databases and other messages.

Referring to FIG. 4B, when a new card is obtained by a player and delivered to the player, the new card is sent from accounting computer 70 to matching computers 90 using a new card message 98. New card message 98 describes the bingo card in a manner allowing the bingo card to be stored in the database of a matching computer receiving the card. Furthermore, new card message 98 is used to transfer bingo cards between matching computers 90 as their roles are modified dynamically during a given bingo game. Finally, new card messages 98 are used to deliver bingo cards back to accounting computer 70 at the conclusion of a game, for archival storage. Each of these operations and uses of message the new card message 98 will be described below in further detail.

As seen in FIG. 4B, a new card message 98 includes a field 100 storing the identifier for the bingo card being delivered by the new card message, and includes a field 102 storing binary encoded representations of the numbers on the card. Furthermore, the new card message includes a field 104 identifying the bingo game in which the card is to be played (as noted, multiple bingo games may be simultaneously administered by computer network 10). A field 106 in message 98 stores binary flags indicating which of the spaces of the bingo cards have been hit by previously called bingo numbers (details on the use and formats of these flags are provided below in connection with FIGS. 7A and 7B). A field 108 identifies an account for the player or retail site where the bingo card was sold, and a field 110 stores a receipt identifier, i.e., the identifier delivered to the player purchasing the bingo card, which is used as a verification of the bingo card if it is presented for collection of winnings.

Referring to FIG. 4C, a game start message 112 is transmitted by game computer 50 to other computers of network 10 to indicate that a particular bingo game has begun. Game start message 112 includes a single field storing the identifier for the game which has started. In response to a game start message 112, matching computers 90 and accounting computer 70 adjust their stored databases and proceed to process called numbers for the game.

Referring to FIG. 4D, a called number message 114 is generated by game computer 50 to identify bingo numbers called for any one or more active bingo games. The called number message is transmitted from game computer 50 all other computers of network 10 so that those computers are notified that the number has been called, and take appropriate action. The called number message 114 includes a field 116 which identifies the called bingo number, followed by fields 118 each of which stores the identifier for a bingo game being administered by network 10 for which the called number is applicable.

It will be noted that multiple bingo games may be simultaneously administered by network 10. Furthermore, bingo numbers called by game computer 50 may relate to one or all or any selection of the currently active bingo games. (Thus, network 10 may administer multiple parallel simultaneous bingo games using multiple streams of called numbers, may administer simultaneous bingo games using the same of stream of bingo numbers, or may administer simultaneous bingo games in which only some of the numbers called are relevant to some of the games being administered.) As each number is called, a called number message 114 is generated by game computer 50, indicating those games to which the called number is relevant, using game identifiers in fields 118.

Referring to FIG. 4E, in response to a called number message 114, matching computers 90 evaluate each bingo card for each game to which the called number is relevant, and respond by generating a number of players message 120. The number of players message 120 is transmitted from each matching computer 90 to game computer 50, permitting game computer 50 to compute statistics on the status of players in the bingo games being administered by network 10. The number of players message 120 includes a number of fields 122, each of which identifies statistics for cards of a particular bingo game being managed by the matching computer transmitting the message. Specifically, each field 122 includes a sub-field 124 identifying a particular game, a sub-field 126 identifying a number of bingo cards for that game being managed by the matching computer generating the message 120, and a sub-field 128 identifying the minimum number of hits on any card being managed by the matching computer (this figure is useful in a bingo game having a "leaster" prize, which is won by having the fewest hits of any bingo card in the game).

As discussed below in further detail, each matching computer has a role in the overall process of matching bingo numbers to bingo cards, with each matching computer being assigned bingo cards which are a certain number of hits away from a winning pattern. By collating number of players message received from a number of matching computers, game computer 50 may determine the total number of players which are specific numbers of hits from a winning patterns and each bingo game, and deliver these statistics for display on the television or satellite system 44, 46, 48 (FIG. 3).

Referring now to FIG. 4F, matching computers also generate a close player message 130 upon determining that a particular bingo card has come to close to a winning bingo pattern As discussed below, the close player message is transmitted from the matching computer to game computer 50 so that game computer 50 may make an announcement of the status of a particular player and may in some circumstances communicate the players location, the location where the player's bingo card was purchased or may be even permit direct contact with the player to enliven the broadcast of the game. A close player message includes a number of fields to identify the player having a near bingo status. Specifically, a field 132 of a close player message 130 stores the identifier of the bingo card of the player that is near to a winning pattern. A field 134 identifies the account of the player or the account of the retail location where the bingo card was purchased. A field 136 identifies the receipt delivered to the player when the card was purchased and a field 138 stores the identifier of the game in which the card is being played. Furthermore, a field 140 identifies the number of hits that the card is away from achieving a bingo. All of this information is used by game computer 50 to announce information regarding the player and/or the card that is close to winning the bingo game, in any manner desired by the master of ceremonies of the game.

When a close player has been identified by a close player message in FIG. 4F, or a winning player has been identified, information about the player can be retrieved from the lottery computer system 30, and/or information about where the winning bingo card was purchased can be retrieved from the lottery computer system 30. To achieve this information, game computer 50 originates a player information request message 142 having the format shown in FIG. 4H, and delivers this message to lottery control system 30 (FIG. 1). The player information request message includes a single field identifying the account number for the player or for the location where the player purchased the bingo card. This account number is used to retrieve further information about the player or about the location where the player purchased the bingo card from the lottery control system 30.

In response to a player information request message, the lottery control system 30 delivers to game computer 50 player information message 144, having the format shown in FIG. 4H. This message identifies specific information about the player or about the location where the player purchased a bingo card. The player information message 144 includes a field 146 identifying the account number of the player or the location where the player purchased the bingo card, and also includes fields 148 which store specific information regarding the player or the location where the player purchased the bingo card. In specific embodiments, the player information in fields 148 may include an identification of the location where the player purchased the bingo card, including a street address and business name. Alternatively, these fields may identify the name of the player and/or the location of the player. If the player is participating in the game by viewing the drawing of bingo numbers at a bingo hall or similar location, the location of the player may be delivered in the player information fields 148. Furthermore, if a closed circuit television connection to the location of the player is available, this closed circuit television connection may be activated so the players location can be broadcast over the television or satellite system 44, 46 and 48 (FIG. 3). As another alternative, if an Internet address for a player is available, and delivered by lottery computer system 30 to game computer 50, an Internet connection may be established to the player, allowing the a player to comment via text of the video, to the master of ceremonies on their winning status or their near winning status. Similarly, connections may be established if the player is connected via telephone or if the a telephone number for the player is stored in lottery computer system 30 and delivered in player information fields 148 All of these alternatives have a potential for enhancing the excitement and interest in the game by putting a human face on the game and providing instant fame to winners of the game and, thus giving the promise of instant fame to players considering participating.

Referring now to FIG. 41, when a winning player is identified by a matching computer, a winner card message 150 is generated by the matching computer and transferred to accounting computer 70 for verification, and then to game computer 50 for announcement. The winning card message 150 is similar to the close player message 130 (FIG. 4F), but includes a few additional fields of information. Specifically, winner card message 150 includes a field 152 for storing the identifier of the winning bingo card. Furthermore, a field 156 stores the account number of the player or of the retail location where the player purchased the bingo card. And, a wining player message includes a field 158 which stores the receipt identifier delivered to the player when the bingo card was purchased by the player. In addition, a field 160 identifies the game in which the card is participating. Finally, field 162 identifies the numbers on the bingo card and field 164 includes flags which identify the location on the bingo card which are matched by called numbers. These last fields can be used by game computer 50 to produce a video representation of the bingo card, showing those locations on the bingo card which were matched by called numbers. This representation may also be produced by Internet server 16 and displayed to players participating in the game over the Internet, or similarly, may be used by ATM server 20 or voice response server 26 to describe the winning bingo card to players participating through an ATM network or the telephone network. Generation and display of the winning bingo card offers a further enticement of potential fame to players of the game, and mans that winning players can immediately confirm that their card is identical to the winning card, and thus be able to convincingly demonstrate to friends and passers by that their card has won the bingo game.

In response to a player having won a bingo game, or in response to other conditions, the master of ceremonies may wish to modify an ongoing bingo game. To modify an ongoing bingo game, game computer 50 generates and delivers modify game messages 166, having the format shown in FIG. 4J, to each matching computer 90 in network 10. Modify game messages 166 cause matching computers 90 to reconfigure to begin applying a new set of rules in the matching process used with bingo cards, so that different winning combinations may be established. A modify game message 166 includes a field 168 storing a game identifier for the game which is being modified by the message. Furthermore, modify game message 166 stores in fields 170, identifiers for winning pattern masks which are no longer valid and which are to be deleted. As discussed in greater detail below with reference to FIG. 7B, winning bingo card patterns are described in matching computers 90 by bit masks, which are applied to bingo cards to determine whether the bingo card has achieved a winning pattern. To modify the rules of a particular game, therefore, winning pattern masks may be added and deleted to describe the new rules of the game. Thus, in addition to fields 170 which identify masks to be deleted, a modify game message 166 includes a number of fields 172 identifying masks to be added. Each field 172 includes a sub-field 174 storing an identifier for the mask being added, a sub-field 176 storing the mask itself, and a sub-field 178 identifying a threshold a number of hits that must fall within the mask for a winning pattern to be achieved. The functions of these sub-fields will be described in greater detail below.

In response to certain predefined conditions, game computer 50 may end a particular bingo game. For example, the event of a player achieving a winning pattern may terminate the game. In such instances, game computer 50 generates a game end message 180 having the format shown in FIG. 4J, and transmits this message to each of the matching computers 90 and accounting computer 70. A game end message 180 includes a field 179 storing the identifier for the game which has been ended by the game computer 50. This identifier is used by the receiving computers to terminate a processing of bingo cards for the game, and to perform other operations discussed in further detail below. (The game end message sent to accounting computer 70 may also include a field 181 identifying the number of hits that a bingo card must have to win a "leaster" prize, if there is such a prize for the identified game.)

As noted above, during administration of one or more bingo games, the roles of matching computers 90 may be dynamically altered for load management purposes. Referring to FIG. 4L, this is done by transmitting role description messages 182. Role description messages are generated by accounting computer 70 and delivered to a matching computers 90, to cause the matching computers 90 to modify their roles in the processing of bingo cards. A role description message 182 includes a field 184 storing a game identifier for the game that the role description message relates to. The role description winner includes forwarding address field 186 for storing addresses to which the matching computer 90 receiving the role description message should forward bingo cards which have reached mask-defined patterns. Finally, role description messages include a handling and backup field 188 which indicate whether the matching computer 90 receiving the message is a handling computer or a backup computer.

(Backup matching computers are responsible for storing and matching bingo numbers to bingo cards, but do not have primary responsibility for forwarding those bingo cards to other matching computers or to game computer 50 upon detecting a winning card. Rather, backup computers perform secondary bingo card number matching on stored bingo cards so that the backup computer can replace the primary handling computer for those cards should the primary handling computer become faulty or the communications links connected to that computer become faulty. Further details regarding the use of backup and handling computers will be discussed below.)

Referring to FIG. 4M, as part of reallocating resources in network 10, card transfer messages 190 are also generated by accounting computer 70 and delivered to matching computers 90, to cause matching computers to transfer bingo cards as part of resource reallocation, a card transfer message includes a field 192 for identifying the forwarding address to which bingo cards should be forwarded (using a new card message 198 (FIG. 4B)). Card transfer message further include fields 194 for identifying bingo cards to be transferred, using card identifiers.

To initiate load sharing by matching computers 90, game computer 50 collects statistics on resource load at various matching computers. These statistics are collected from number of cards messages (see FIG. 4E). When the game computer 50 determines that resources should be reallocated, it generates a reallocate resources message 196 having the format shown in FIG. 4N. The reallocate resources message 196 identifies the resource load of all matching computers in network 10, and is used by accounting computer 70 to compute the appropriate resource reallocation strategy for balancing the computational burden on matching computers 90. The reallocate resources message 196 includes a number of fields 198 each of which includes a sub-field 200 storing an identifier of a matching computer, and a sub-field 202 identifying the resource load of that matching computer. Accounting computer 70 responds to a reallocate resource message 196 by determining the appropriate reallocation of resources amongst matching computer 90, and generating in response role description and card transfer messages, to cause matching computers 90 to reconfigure and thereby balance the computational burden on matching computers 90. Further details on this process will be discussed below.

Figure 5A:
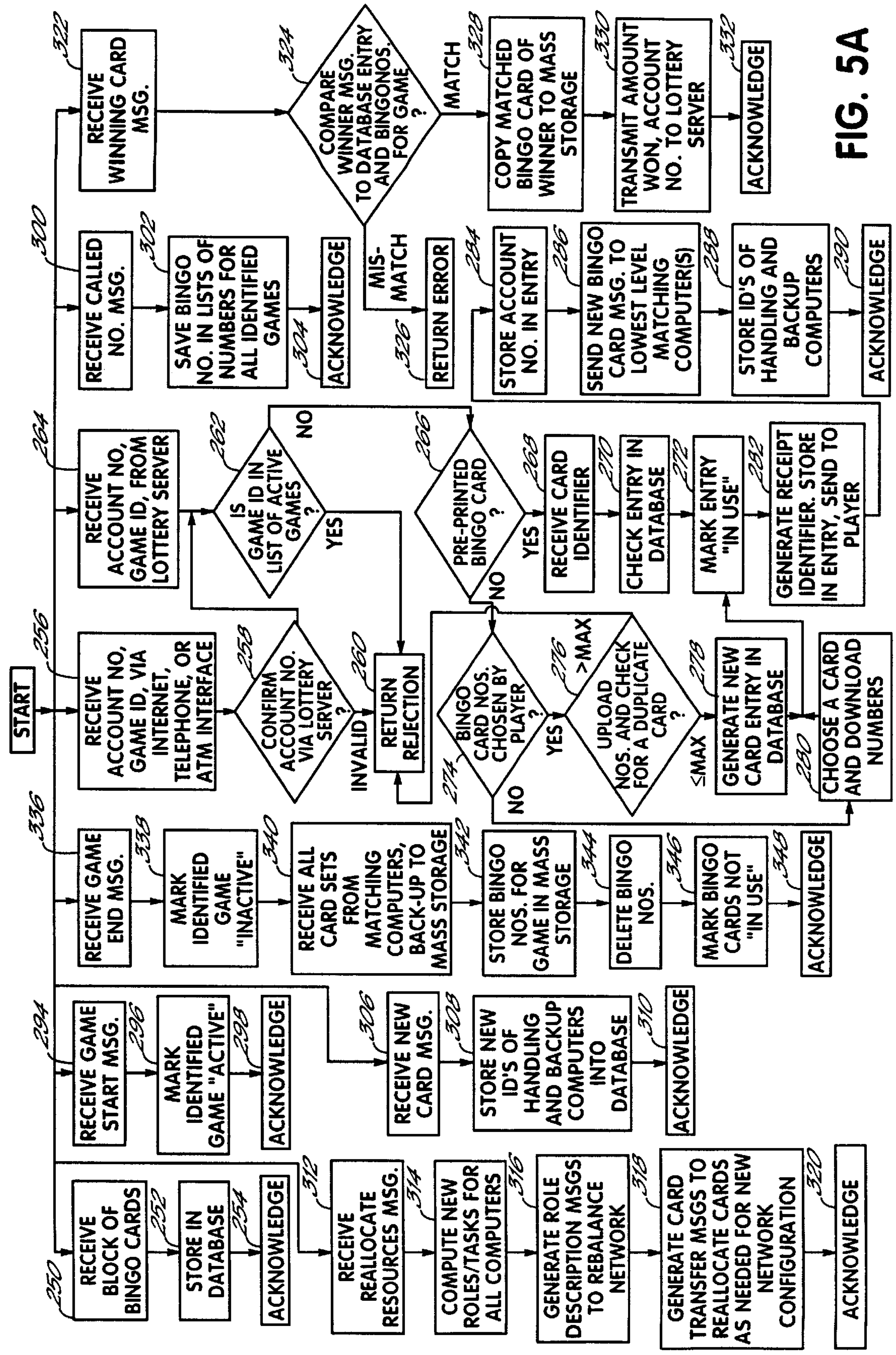
FIG. 5A is a flow chart illustrating the process performed by the accounting computer of the computer network of FIG. 3.
Figure 5B:
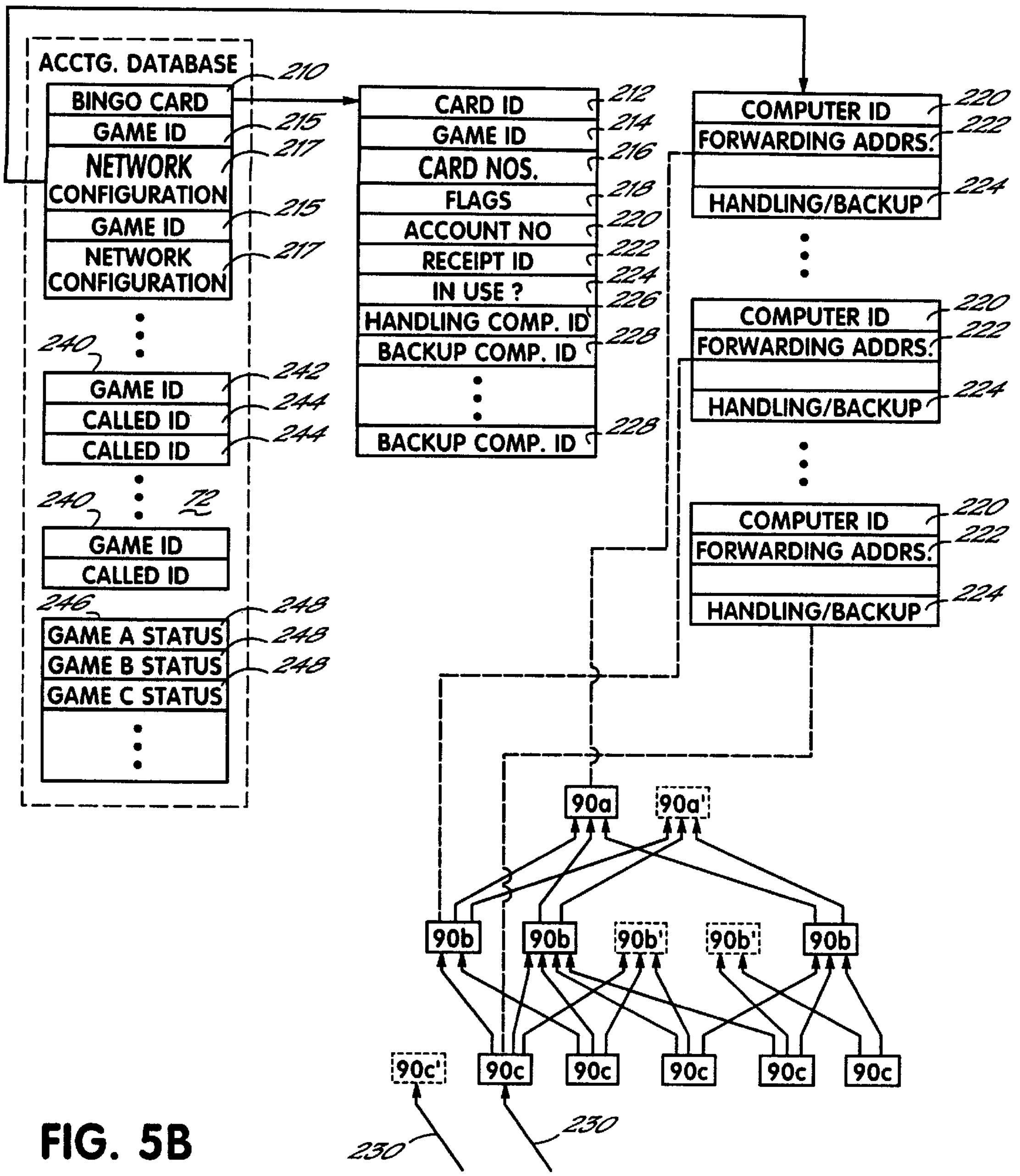
FIG. 5B is a data structure diagram illustrating the data structures stored and maintained as part of the accounting process.

Referring to FIGS. 5A and 5B, details on the processes used by accounting computer 70 can be described in further detail. As seen in FIG. 5B, the database 72 used by accounting computer 70 includes a number of types of data. In particular, this database includes one or more records 210 for storing bingo cards. Each bingo card is stored in the form shown generally in FIG. 5B. Specifically each card has a card identifier 212, a game identifier 214 identifying the game in which the bingo card can be used or is being used, binary encoded card numbers 216 describing the bingo numbers on the card, binary coded flags 218 indicating which of the numbers on the card have been matched by called bingo numbers, an account number 220 identifying the account, if any, of the player who purchased card or the retail location where the card was purchased, and the receipt identifier 222 which was delivered to the customer who purchased the bingo card. In addition to these fields, additional fields are used to monitor the status of the bingo card during progress of the game. Specifically, a field 224 stores a flag indicating whether the bingo card is in use, a field 226 identifies which of the matching computers 90 is handling matching of bingo numbers to the card, and one or more fields 228 identify which handling computers are performing matching of bingo numbers to the card for backup purposes. These fields are stored for each bingo card in accounting database 72 and are updated as details on the use and matching of the bingo card are received by accounting computer 70.

Also stored in accounting database 72, are a number of configuration records. These records are used to identify the configuration of matching computers 90, for each game being administered by network 10. The format of a network configuration record is shown in detail in FIG. 5B. Each network configuration record includes a field 215 storing a game identifier for the game that the network configuration record describes the computer configuration for. In addition, network configuration fields 217 in each record describes the configuration of the network for that game. The network configuration fields 217 includes a number of computer role description fields as shown in FIG. 5B. Each of these role description fields describes the role of one handling computer 90 in network 10. Specifically, a field 220 stores an identifier of a matching computer being used to administer the bingo game identified in field 215, a forwarding address field 222 stores the address of a matching computer to which bingo cards should be forwarded when the bingo card meets the criteria of that matching computer. Field 222 may store a single forwarding address, or may store multiple forwarding addresses, as is desired to provide the desired level of redundancy for fault tolerance. Finally, a field 224 identifies whether the matching computer is being used as a backup computer or as the primary handling computer for bingo cards.

As seen in FIG. 5B, at any given time, the matching computers 90 in network 10 are arranged in a hierarchal pattern. Specifically, matching computers 90*c* at the bottom of the hierarchy are responsible for receiving newly authorized bingo cards for the game as identifying by arrows 230, and are responsible for forwarding bingo cards that are close to a winning status, to higher level matching computers 90*b*. Each matching computer 90*c* may forward bingo cards to multiple higher level matching computers 90*b* as is desired to achieve the desired level of redundancy. Furthermore, one matching computer 90*c'* may be responsible for performing backup computations for other matching computers 90*c*. In this case, backup computer 90*c'* does not forward bingo cards to higher level matching computers 90*b*, but rather matches bingo numbers to bingo cards, and stores the results in case a failure in a lowest level matching computer 90*c* requires that the backup bingo card record stored in backup computer 90*c'* be used. It will be noted additional backup computers 90*b'* are included amongst the second level matching computers 90*b*. These backup computers 90*b'* receive bingo cards forwarded from lower level matching computers 90*c*, so as to match called bingo numbers to those cards in parallel with other second level matching computers 90*b*. Backup matching computers 90*b'* do not forward bingo cards to top most level of matching computer 90*a*, but rather hold bingo cards in memory, so that if another second level matching computer 90*b* experiences a failure, backup copies of bingo cards stored in matching computer 90*b'* can be substituted for those stored in the computer experiencing the failure. Similarly, a backup computer 90*a'* receives copies of bingo cards forward by mid-level matching computers 90*b*, and matches these to called bingo numbers, and stores the bingo cards as a backup to the top level handling computer 90*a*.

As discussed above, accounting computer 70 tracks the resource load of matching computers 90 and configures matching computers 90 with appropriate roles to balance the resource load on matching computers 90. Specifically, the roles of matching computers 90 may be changed through the progress of a bingo game or through the progress of multiple simultaneous bingo games in order to insure that particular matching computers do not carry an overly large or an overly small proportion of the computational burden. Details of these operations will be discussed below in reference to FIG. 5A.

In addition to the foregoing descriptive data, database 72 used by accounting computer 70 further includes records for storing archival and game status data Specifically, the number of records 240 store the bingo numbers called for each particular game. Each record 240 includes a field 242 having the game identifier for the game for which called numbers have been stored, and fields 244 storing the numbers that were called for that game. As discussed below, accounting computer 70 performs a verification process in response to receiving notice of a winning bingo card, comparing the called numbers to the winning bingo card, to insure that the bingo card has in fact won the game.

Database 72 further includes records 246 identifying the status of each game being managed by network 10. Records 246 include fields 248 for each game being managed by network 10, each field identifying whether the game is an active game, i.e., a game being played currently, or an inactive game, i.e., a game in which bingo cards are still available and for sale. Use of this information is discussed below with reference to FIG. 5A.

As seen in FIG. 5A, the process performed by accounting computer 70 to manage an ongoing bingo games is an event driven process. Accounting computer 70 responds to messages received from other computers of network 10 and performs certain actions as described in FIG. 5A. These actions will be discussed below in the order in which they are performed for a particular game. However, it will be appreciated that since multiple games are simultaneously managed by the accounting computer 70, each game may be in a different state of development and therefore various actions shown in the flow chart of FIG. 5A, may be undertaken in random order for the various games, as determined by the progress of those games.

Before games are played or before bingo cards are sold, electronic representations of the bingo cards to be used in the game are delivered to accounting computer 70 via a bingo cards message 92 (FIG. 4A). When this message is received 250, by accounting computer 70, accounting computer 70 responds by storing the bingo cards described by the message 92 into database 72 into entries 210. Then, accounting computer 70 acknowledges 250 receipt of the bingo cards.

After receiving bingo cards, bingo cards are sold by accounting computer 70 in response to requests from players. Players may purchase bingo cards via the Internet, telephone or ATM interfaces described above or via the lottery server or the lottery terminals as described above. When a bingo card is purchased using the Internet, telephone or ATM interfaces to network 10, an account number and game identifier are delivered to accounting computer 70 in step 256. In response to this information, accounting computer 70 communicates with lottery server 30 to verify the validity of the account number (step 258). As noted above, the lottery server 30 is responsible for handling all financial transactions and maintains accounts for all retail locations where bingo cards may be sold, as well as individual accounts for individuals who purchase bingo cards directly. Thus, a bingo card purchase request received other than through the lottery computer system 30 is first confirmed with lottery computer system 30 to verify the validity of the request and of the account number included there.

Lottery computer system 30 will either approve the account number or reject the account number forwarded by accounting computer 70. If the account number is rejected as invalid, a rejection message is returned in step 260 to the Internet telephone or ATM interface, notifying the player that the account number is not valid and that no bingo card will be delivered. However, if the lottery computer system 30 confirms the account number delivered by the player, accounting computer 70 proceeds to step 262 to determine whether a bingo card can be sold for the requested game.

When a bingo card is sold through the lottery computer system 30, the lottery computer system 30 upon receiving a bingo card request delivers a game identifier identifying the game for which the bingo card is being purchased to accounting computer 70 (step 264). In response to this game identifier, accounting computer 70 also proceeds to step 262 to determine whether bingo cards can be sold for the identified game.

In step 262, accounting computer 70 accesses records 246 in database 72 to determine the status of the identified game. If the game is an active game, then bingo card sales are blocked for that game. In this case, accounting computer 70 proceeds to step 260 to return a rejection, indicating that a bingo card for the rejected game will not be sold because the game is currently being played. However, if the identified game is not on the list of active games in records 246 in database 72, accounting computer 70 proceeds from step 262 to step 266.

In step 266, accounting computer 70 determines whether the player is requesting validation of a previously printed bingo card. As noted above, the players may receive preprinted bingo cards from newspaper inserts, lottery instant tickets or other sources and validate those bingo cards for play in a particular game by delivering a bingo card identifier to network 10. Alternatively, players may either define their own bingo card, by describing the numbers on the bingo card, or may request that a bingo card be randomly chosen and delivered to them.

Assuming for the moment that the player is attempting to validate a preprinted bingo card, accounting computer 70 proceeds to step 268 in which accounting computer 70 receives the card identifier from the player. As noted above, each card in database 72 is associated with a card identifier, and this identifier is printed on any preprinted bingo cards. Thus, a player wishing to validate a preprinted bingo card may simply deliver the card identifier for validation at any time. Upon receiving a card identifier, accounting computer 70 checks 270 the entry for that card in the database and marks that entry 272 as in use. This step permits accounting computer 70 to later determine that the bingo card has been validated for the current game, in case a later request is made to validate the bingo card for the same game.

As discussed above, this process for validating a preprinted bingo card facilitates wide distribution of bingo cards and advertising for play in the bingo game. A prospective player having a bingo card will potentially be more enticed to participate in the game as a result of the ease of entering the game using a preprinted bingo card.

As a further aspect of the invention, preprinted bingo cards may also be prepaid; that is, preprinted cards may be purchased by players for use in any subsequent game. In this situation, the card identifier is used in place of the account number in step 266 and/or 264 and that account number is confirmed with the lottery server 30 to insure that the preprinted bingo card has not previously been used. If the bingo card has not previously been used, then the bingo card is entered into the current bingo game in response to user's request without requiring any money transfer. This approach to sales of bingo cards is similar to marketing techniques used in connection prepaid telephone services, and may be appealing to potential players in that bingo cards may be purchased at retail locations when convenient and later validated via telephone from home when it is desired to participate in the current bingo game about to be broadcast over television, for example. It is anticipated that sales of prepaid bingo cards will be robust as a results of the convenience and flexibility of those cards It will be further appreciated, that preprinted bingo cards needs not be limited to a single use. For example, a player holding a preprinted bingo card that is perceived to be "lucky" may repeatedly validate that bingo card for subsequent bingo games in the same manner in which is was initially used, with the exception that prepaid bingo cards will be limited to one or a small number of games before the prepaid amount is consumed, and then subsequent plays on that preprinted card must be purchased in the same manner as non-prepaid bingo cards.

Returning now to step 266, in the case where the player does not have a preprinted bingo card, accounting computer 70 proceeds to step 274, in which accounting computer 70 determines whether the player wishes to have a randomly selected bingo card delivered to them or instead wishes to select the numbers for the bingo card. If the player wishes to choose the numbers for the bingo card, accounting computer 70 proceeds to step 276, in which the numbers defined by the player are uploaded to accounting computer 70. When the entire bingo card has been defined, the uploaded numbers are then used to search database 72 to locate any duplicate bingo cards stored in database 72 which are marked as "in use". In some instances, it may be desirable to prevent duplication of bingo cards in database 72, either for the purpose of risk management on the part of the bingo game organizer, or if the player desires to have a unique bingo card. If a check of database 72 reveals that there is a duplicate card, accounting computer 70 determines whether more than the permissible number of duplicate cards have been generated. As noted above, there may be a limit of, e.g., five duplicate bingo cards that will be permitted in any game, or no duplicates may be allowed in which case the maximum number of duplicates is zero. If the maximum number of duplicate cards is exceeded, the bingo card request is rejected by sequencing to step 260 and returning a rejection message indicating that the bingo card is a duplicate. Alternatively, if the bingo card is not rejected as a duplicate, processing proceeds to step 278 in which accounting computer 70 generates a new bingo card entry 210 in accounting database 72. The new entry is filled in with the bingo card numbers identified by the player and with the account number and game identifier delivered by the player. A unique card identifier is stored in field 212, and the flags in field 218 are set to zeros. Thereafter, processing proceeds to step 272 and the new entry is marked as "in use".

Returning now to step 274, if a player requests that a randomly selected card be delivered to them, processing proceeds to step 280 in which accounting computer 70 chooses one of the bingo cards in database 72, at random, and downloads the numbers from that bingo card to the player. Thereafter, processing proceeds to step 272 and the selected bingo card is marked as "in use".

After a chosen or new bingo card entry is marked as "in use", processing proceeds from step 272 to step 282, in which a unique receipt identifier is generated and stored in the bingo card entry, and sent to the player. As noted above, the receipt identifier may be printed if the player is near to a printer such as a lottery or ATM machine, or a personal computer connected over the Internet. Otherwise the receipt identifier will be delivered orally over the telephone line or displayed on a display screen for the user to write down. After generating an appropriate receipt identifier and delivering it to the player, the account number of the player obtained in steps 256 or 264 is stored 284 in the bingo card entry. Finally, steps are taken to forward the bingo card to matching computers. Specifically, in step 286, a new bingo card message 98 (FIG. 4B) is delivered to the lowest level matching computers for the game. (The lowest level matching computers are identified by network configuration fields 217 for that game in database 72.) At the same time, in step 288, the identifiers of the handling and backup computers to which the new bingo card were forwarded are stored in fields 226 and 228 of the bingo card entry 210. Finally, the purchase is acknowledged in step 290 closing the transaction.

Following the steps described above, bingo cards are sold to players in preparation for a bingo game. Ultimately, the master of ceremonies for the bingo game initiates the game by causing game computer 50 to generate a game start message 112 (FIG. 4C) and transmit this message to the network of computers including accounting computer 70. In response to receipt of a game start message in step 294, accounting computer 70 marks the identified game as active in records 246 in database 72 (step 296). This prevents further sales of bingo cards for the identified game. Subsequently, in step 298 the game start message is acknowledged to game computer 50.

Once a game is commenced, game computer 50 regularly produces called number messages 114 (FIG. 4D). Called number messages are delivered to each matching computer 90 for the purposes of matching numbers to bingo cards. Called number messages are also delivered to accounting computer 70 so that accounting computer 70 may maintain a complete list of called numbers for each game in records 240 in database 72. Thus, when a called number message is received 300, accounting computer 70 saves 302 the bingo number identified in the message into a field 244 of a record 240, for each game that the number pertains to (as identified in fields 118 of the message). This insures that the list of called numbers in record 240 in database 72 is complete for all active games. After step 302, accounting computer 70 acknowledges 304 the called number message.

As a game progresses, as described above, bingo cards originally stored in lower level matching computers are transferred from those computers to higher level matching computers, as the bingo cards become close to a winning combination. Each time a bingo card is transferred, a new bingo card message 98 (FIG. 4B) is generated by the matching computer transferring the bingo card. The new bingo card is sent to the matching computer which is to receive the new bingo card. At the same time, the new bingo card message is forwarded to the accounting computer 70 so that accounting computer 70 can track the location of the bingo card in the matching computer network. When the new card message is received in step 306, the identifiers of the new handling and backup computers in which the bingo card is stored are placed into the bingo card entry 210 in accounting database 72 (step 308) Thus, the entry for the bingo card in accounting database 72 always has a current record of where bingo cards are located in the network of matching computers. After storing the new locations of the bingo card, the new card message is acknowledged in step 310

During a bingo game, game computer 50 may determines that the computational resources of network 10 are not appropriately balanced in light of the current computational load. In such a such a circumstance, game computer 50 generates a reallocate resources message 196 (FIG. 4N) and delivers this message to the accounting computer 70, to cause accounting computer 70 to reallocate tasks amongst matching computers 90. Upon receipt of a reallocate resources message in step 312, accounting computer 70 proceeds to computes 314 new roles or tasks for all matching computers 90. As part of this step, accounting computer 70 may evaluate the number of bingo cards being matched by each matching computer as determined from the entries 210 in database 72. Accounting computer 70 may then determine how best to reallocate the duties of handling bingo cards so as to have the bingo cards appropriately and relatively evenly allocated to matching computers. After computing the new roles and tasks in step 314, accounting computer 70 generates 316 role description messages 182 (FIG. 4L) to be forwarded to matching computers 90 to change those roles of matching computers 90. The generated role descriptions messages are then forwarded to the matching computers to cause the matching computers to take on their new roles. Thereafter, in step 318, accounting computer 70 generates card to transfer messages 190 (FIG. 4M) to cause bingo cards stored in matching computers to be redistributed amongst the matching computers in accordance with the new network configuration. After thus reallocating the resources of matching computers 90, the reallocate resource message is acknowledged in step 320.

As a game continues to progress, ultimately accounting computer 70 will receive a winning card message 150 (FIG. 41) from a matching computer. As discussed above and elaborated below, matching computers 90 send winning card messages to accounting computer 70 and then to game computer 50, upon determining that bingo card has achieved a winning pattern. The message is first sent to accounting computer 70 to obtain a confirmation that the card is a winning card, and then the message is sent to the game computer. Accordingly, in step 322 when accounting computer 70 receives a winning card message, accounting computer 70 proceeds to step 324 to verify the winning card. Specifically, accounting computer 70 compares the card described in the message to its database 72 to confirm that the card is in fact a winner of the game. To do so, first accounting computer 70 compares the list of the bingo numbers in field 162 of the winner card message 150 to the stored card numbers in field 216 of the bingo card entry 210 in accounting database 72 (step 324). Only if the card numbers in the winner card message match those in the account database 72 will accounting computer 70 proceed to its second step. In the second step, the called bingo numbers stored in a record 240 for the game in which the card is participating, are compared to the bingo numbers on the wining card. Accounting computer 70 thus performs an independent check on the locations on the bingo card which have been hit by called bingo numbers. This pattern of locations is then compared to the flags stored in field 164 of the winner card message 150. Only is there is a match between the pattern of hit locations on the bingo card and the flags in field 164, can it be confirmed that bingo card is in fact a winning card. If there is a mismatch at any point in this process, accounting computer 70 proceeds to step 326 and returns an error in response to the winning card message, thus indicating that there is a mismatch and that the card may not be a winning card.

If, however, the winning card message is confirmed and matches the accounting database 72, accounting computer 70 proceeds to step 328 in which the bingo card of the winner is copied to a mass storage location accessible to accounting computer 70 for permanent archival storage. At the same time, an indication of the amount of the prize won by the winning bingo card and that account number of that bingo card are transmitted to the lottery server 30 so that the lottery server 30 is able to payout to the winning card holder (step 330). After these steps, in step 332, accounting computer 70 acknowledges receipt of the winning card message.

As discussed above, at the end of a bingo game, a game end message 180 (FIG. 4K) is transmitted from game computer 50 to other computers in network 10. In response to receiving a game end message (step 336), accounting computer 70 prepares to make an archival record of all of the bingo cards participating in the bingo game. In a first step 338, the identified game is marked as inactive in section 246 of the accounting database 72. After these steps, accounting computer 70 will begin to receive bingo card messages 92 from all of the matching computers (step 340). As bingo cards are received from matching computers, the bingo cards are backed up into a mass storage location accessible to accounting computer 70. Thus, a permanent record of all bingo cards played in the game and the status of those cards as of the end of the game is stored in mass storage. Thereafter, in step 342, the called bingo numbers stored in the record 240 for the identified game are moved to mass storage as well. (If there is a "leaster" prize for the game identified by the game end message, the game end message includes an identification of the number of hits that a card must have to qualify for the "leaster" prize, and this number is stored into mass storage with the other identified data, and can be used to confirm the eligibility of a particular bingo card to collect the "leaster" prize if and when the player attempts to collect it.) Thus, a complete record of the game is created, including the numbers called and the cards played, are collected in mass storage. Finally, in step 344, the list of called bingo numbers in record 240 in database 72 is deleted. Subsequently, in step 346, all of the bingo card records 210 in database 72 are marked as not "in use" so that those bingo card records can be used in subsequent bingo games. Alternatively, some or all of the bingo cards records 210 may be deleted from accounting database 72, if the bingo cards will not be reused in subsequent games. After these steps, in step 348, the end game message is acknowledged by accounting computer 70.

Figure 6A:
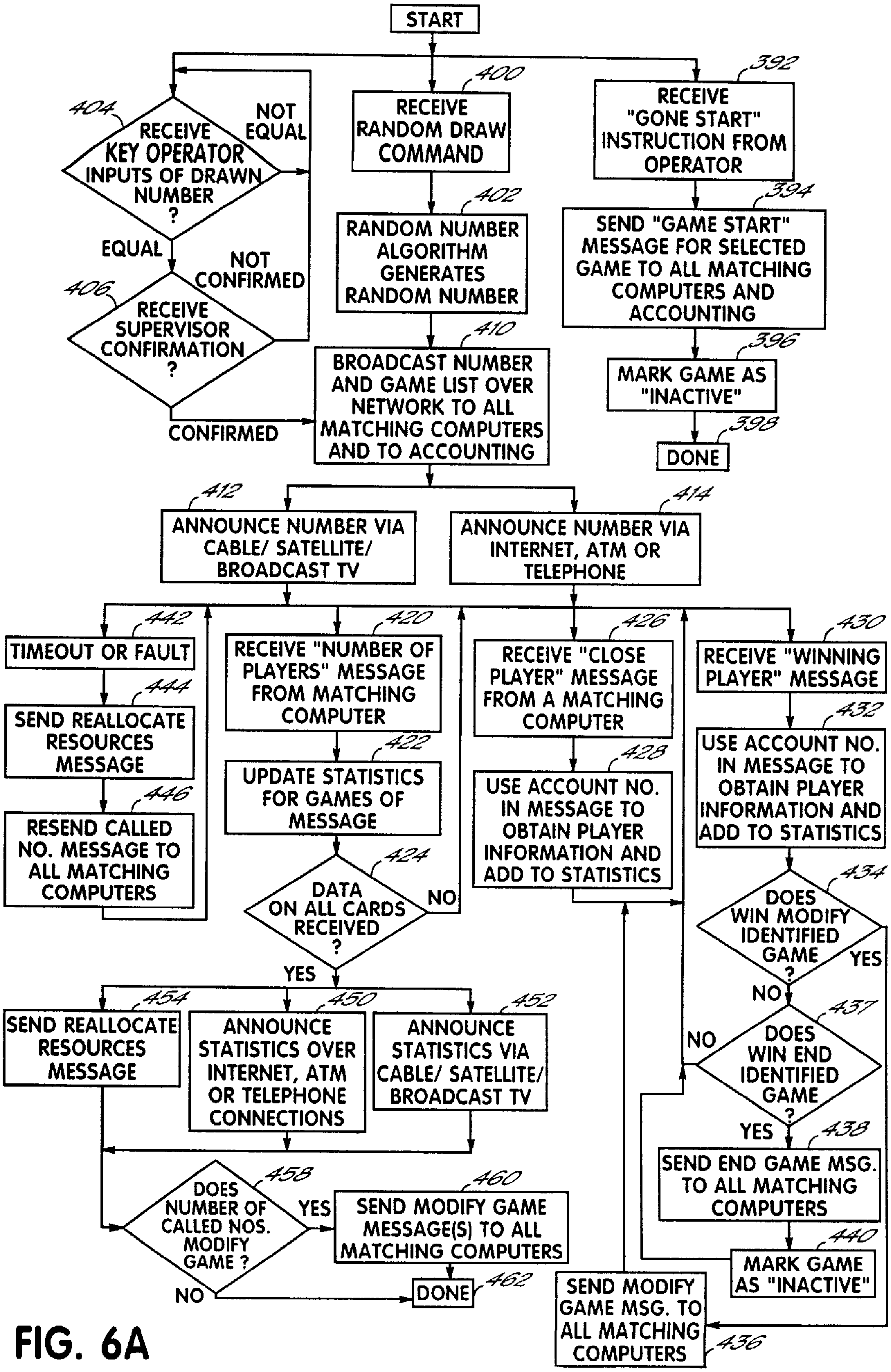
FIG. 6A is a flow chart illustrating the process performed by the game computer of the computer network of FIG. 3.

Referring now to FIGS. 6A and 6B, the steps undertaken by the game computer 50 in management of computer network 10 can be discussed. Game computer 50 operates in an event driven manner, i.e., actions are taken in response to certain events.

As seen in FIG. 6B, game computer 50 interacts with a memory database 350 of information regarding current ongoing bingo games. The first section 352 of this database includes records identifying and describing each game being administered by game computer 50. Each record in this section 352 of database 350 includes a game identifier field 354 identifying a game being administered by game computer 50, and a game description field 356 including data describing the rules (i.e., winning patterns) of that game. As detailed in FIG. 6B, the game description field 356 includes a number of sub-fields, each relating to one of the binary masks used in determining whether bingo cards have reached the winning status. Specifically, the records in game description field 356 each include a field 358 storing a mask identifier for a mask, a field 360 storing a binary representation of that mask, and a field 362 storing a threshold value of a number of bits within that mask which must be matched on a bingo card, for that bingo card to reach a winning status. The use of masks in matching bingo cards will be discussed in further detail below in connection with FIGS. 7A and 7B.

In addition to the foregoing, the game computer database 350 includes a number of records 370 for storing called numbers associated with each of the active games. Each of these records includes a field 372 for storing a game identifier for a game being administered by game computer 50, and a plurality of called number fields 374 each identifying a called bingo number for that game.

In addition to the foregoing, the game computer database 350 includes records 378 for identifying the status of each game being managed by game computer 50. These records 378 indicate the status, active or inactive, of each game being managed by game computer 50.

The further section in game computer database 350 includes records 380 for storing statistics on the status of players in each of the active games being managed by game computer 50. Each of these records includes a field 382 storing a game identifier and a field 384 storing statistics for that game.

Finally, game computer database 350 stores records 386 for storing information on the resource load in each matching computer in network 10. Specifically, each record 386 includes a field 388 storing an identifier of a matching computer and a field 390 for storing a reported resource load of that computer. This data is used in determining whether to reallocate network resources during management of bingo games, as discussed in detail below.

Now returning to FIG. 6A, at the commencement of a game, in step 392, game computer 50 receives a game start instruction from an operator. In response, in step 394 game computer 50 produces a game start message 112 and transmits this message to all matching computers 90 and the accounting computer 70. Subsequently, in step 396, game computer 50 marks the game as active in the appropriate field 378. Processing of the game start instruction is then done (step 398).

Once at least one bingo game has commenced, all processing of game computer 50 commences with the draw of bingo numbers. There are two ways in which bingo numbers can be drawn. Game computer 50 may generate the numbers by a pseudo-random number algorithm. In this case, in step 400 a random draw command is received from the operator, and in response, in step 402 a random number algorithm in game computer 50 generates a random number and converts this random number into a bingo number. Alternatively, as described above, bingo numbers may be drawn by a ball machine or other mechanical random number generating device. In this case, the game computer 50 in step 404 receives key operator inputs identifying the number drawn by the mechanical ball machine. If these key operator inputs are not equal, game computer 50 requests and receives repeat key operator inputs of the drawn number. Only when the key operator inputs are equal, does the game computer 50 proceed to step 406 in which the drawn number identified by the key operators is displayed for the supervisor's confirmation. If the supervisor does not confirm the drawn number, game computer 50 requests and receives repeat key operator inputs of the drawn number. Only if the supervisor confirms the drawn number is the number assumed to be correct.

When a number has been generated and is available in game computer 50, either as a result of steps 400 and 402 or steps 404 and 406, game computer 50 proceeds to step 410. In step 410, game computer 50 generates a called number message 114 (FIG. 4D) by storing the bingo number and a list of the bingo games to which that bingo number relates, into a called number message 114 and then broadcasting this message to all matching computers 90 and to the accounting computer 70. Subsequently, game computer 50 delivers news of the called number to players tracking the game by announcing the number via the cable satellite or broadcast television connection (step 412), and/or announcing the number via Internet, ATM and/or telephone connections (step 414). After thus broadcasting the called number, game computer 50 forthwith begins receiving messages from matching computers 90 in network 10, as those matching computers respond to the called number.

Specifically, as will be discussed below, after each matching computer 90 finishes processing a called number message, the matching computer sends to game computer 50 a number of players message 120 (FIG. 4E) identifying the number of bingo cards remaining in that computer. Thus, after broadcasting a called number, game computer 50 begins receiving in step 420 number of players message from matching computers. As each number of players message is received, game computer 50 proceeds to step 422 to update the statistics in records 380 in database 350, in response to the number of players message. Game computer 50 then determines in step 424 whether data on all bingo cards for all games has been received through number of player messages. If not, game computer 50 continues to wait for additional messages.

While game computer 50 is awaiting the receipt of number of players messages from all matching computers relating to bingo cards, game computer 50 may receive a close player message 130 (FIG. 4F) indicating that a particular player is close to achieving a winning "bingo" status. When a close player message is received in step 426 from a matching computer, game computer 50 proceeds to step 428 and uses the account identified in the close player message to obtain information relating to that player, specifically by sending a player information request message 142 (FIG. 4G) to lottery server 30 and receiving a player information message 144 (FIG. 4H) from lottery server 30. This player information is then added to the statistics in the appropriate record 380. Thereafter, game computer 50 awaits further messages.

Game computer 50 may also receive a winning a player message indicating that a matching computer has found a bingo card which has achieved a bingo. When this occurs, game computer 50 receives the winning player message in step 430, and proceeds to step 432 in which game computer 50 uses the account number identified by the winning player message to obtain information relating to the player (m the same manner as described above with reference to step 428) and adds this player information to the statistics stored in the appropriate record 380 in database 350.

Next, game computer 50 proceeds to step 434 in which game computer 50 determines whether a "bingo" by a player, modifies the game in which the player achieved "bingo". As noted above, in some forms of the game of "bingo", a bingo by a player does not end the game, but rather changes the winning pattern. For example, the wining pattern may be a row of hits, until a player achieves a row of hits, at which time the winning pattern becomes one row and one column of hits. Any number of possible combinations of winning patterns may be established using principles of the present invention. If the bingo causes modification of the identified game, game computer 50 proceeds from step 434 to step 436 in which it sends a modify game message 166 (FIG. 4J) to all matching computers. The modify game message 166 identifies new masks, new thresholds, or both for the game, as discussed above, to thereby change the winning patterns for the game.

In some forms of bingo, a bingo by a player ends the game. Thus, if the bingo does not modify the identified game, then game computer 50 sequences from step 434 to step 437 to determine if the bingo ends the identified game, if so, game computer 50 proceeds to step 438 and sends an end game message 180 (FIG. 4K) to all matching computers 90 and accounting computer 70, causing all matching computers to terminate processing of the game, and causing the accounting computer 70 to prepare to collect archival information on the game, as described above. (If there is a "leaster" prize for the terminated game, the game end message transmitted to accounting computer 70 includes an indication of the lowest number of hits reported by any of the matching computers 90 for that game. This number of hits is stored by accounting computer 70 for later use in verifying that cards are eligible for winning the "leaster" prize.) Thereafter, in step 440, game computer 50 modifies the record 378 for the game to identify the game as "inactive". After step 436 or 440 (or step 437, if the bingo does not end the identified game), game computer 50 returns to wait for additional messages from matching computers 90 in network 10.

Over a reasonably short period of time, game computer 50 should receive number of players messages from each matching computer 90 in network 10. If a period of time expires and these messages have not been received from a particular matching computer 90, game computer 50 will time out and detect a fault in step 442. After timing out, game computer 50 will proceed to step 444, in which it sends a reallocate resources message 196 (FIG. 4N) to accounting computer 70. In this message, a special resource load value (e.g., greater than 100% or less than 0%) is associated with the matching computer which failed to respond, thus indicating that the non-responsive matching computer 90 is apparently faulty and should not be included in the reallocated network structure. In response to the reallocate resources message, as discussed above, accounting computer 70 will reallocate matching computers and reconfigure the role of matching computers appropriately. Thereafter, matching computers 90 will be ready to receive subsequent called number messages. To insure that no matching computers have failed to receive the called number, after step 444, game computer 50 proceeds to step 446 in which it resends the called number message sent in step 410 to all matching computers 90. Then game computer 50 proceeds to wait again for the number of players messages from all matching computers 90.

In the absence of a fault, game computer 50 will receive a number of player message from all matching computers 90. Once all of these messages have been received, game computer 50 will proceed from step 424 to steps 450 and 452, to announce statistics for bingo games managed by game computer 50.

Statistics may be delivered to the players in one of a number of forms. For example, statistics may be announced over an Internet, ATM or telephone connection in step 450. Alternatively, statistics may be announced via cable satellite and broadcast TV in step 452. These steps may include the step of announcing the name or location of a close or winning player, as well as the step of contacting a close or winning player or contacting the venue where a close player is residing as discussed above.

When a winning player is announced, if the game has come to an end as a result of the winning player, and there is a "leaster" prize for the game, the statistics collected by the game computer 50 (from received number of players messages), will include an indication of the minimum number of hits identified by each of the matching computers. The smallest of these, is the number of hits that a player must have to win the "leaster" prize. In many cases, there will be many winners of the "leaster" prize; therefore, no provision is made for announcing the names or information regarding "leaster" winners. Nevertheless, the number of hits that one must have to win the "leaster" prize is reported along with the other statistics, so that players may determine if they are eligible to collect the "leaster" prize, and collect it through the various means described above.

Analysis of the statistics collected from number of players messages, may indicate an imbalance of computational burdens in network 10, as identified by the resource load information received with the numbers of players messages. In such a situation, game computer 50 also proceeds in step 454 to send a reallocate resources message 196 (FIG. 4N) to accounting computer 70 to cause accounting computer 70 to reconfigure the network for load balancing.

After calling a number and announcing the resulting statistics, game computer 50 proceeds to step 458 in which game computer 50 determines whether the number of called numbers modifies any one of the games currently being administered by game computer 50. This may be useful, for example, where the bingo game administration wishes to establish a jackpot for achieving a "bingo" within a very small number called numbers. For example, the game administration may wish to award a special jackpot to any player who achieves a row of five hits in five called numbers. In a situation of this kind, the game must be modified after five numbers have been called so that the jackpot is not longer applicable. Thus, if the number of called numbers modifies any game, game computer 50 proceeds from step 458 to step 460, in which modify game messages 166 (FIG. 4J) are transmitted to all matching computers 90, thus modifying all wining patterns used by those matching computers to eliminate the jackpot pattern. Thereafter (or immediately after step 458, if the number of called numbers does not modify a game), game computer 50 completes its processing (step 462), and thereafter awaits another random draw start the process over.

Figure 7B:
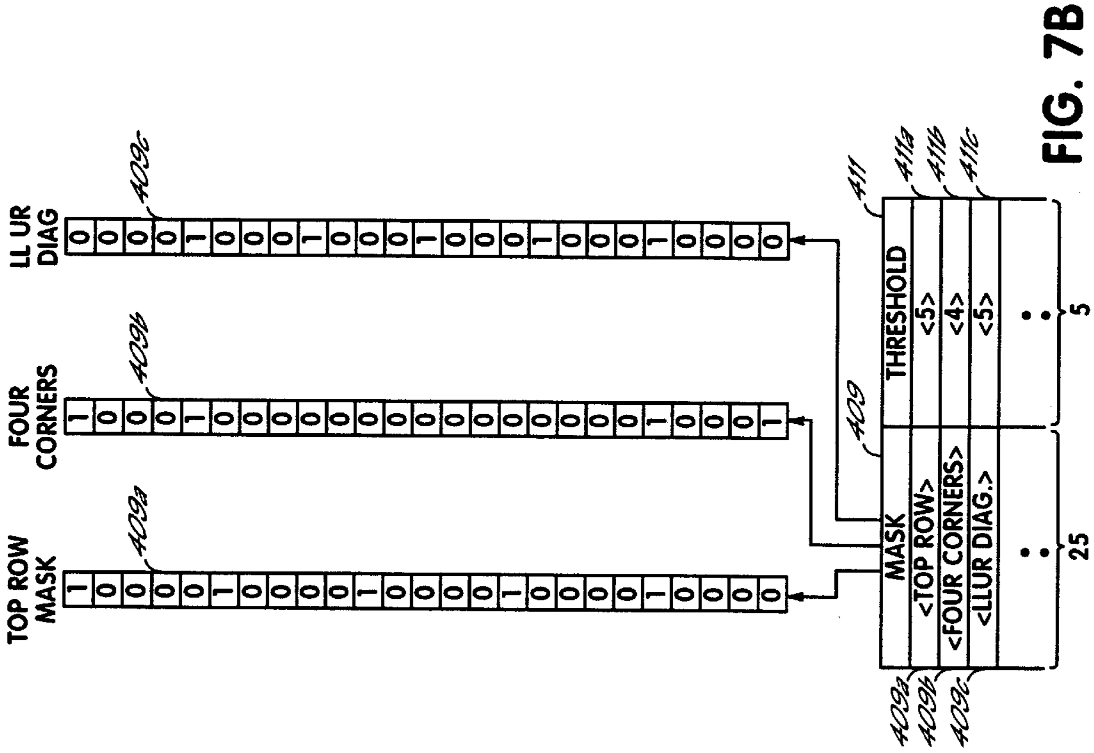
FIG. 7B is a diagram illustrating the masks used to represent winning bingo card patterns in the computer network of FIG. 3.
Figure 7A:
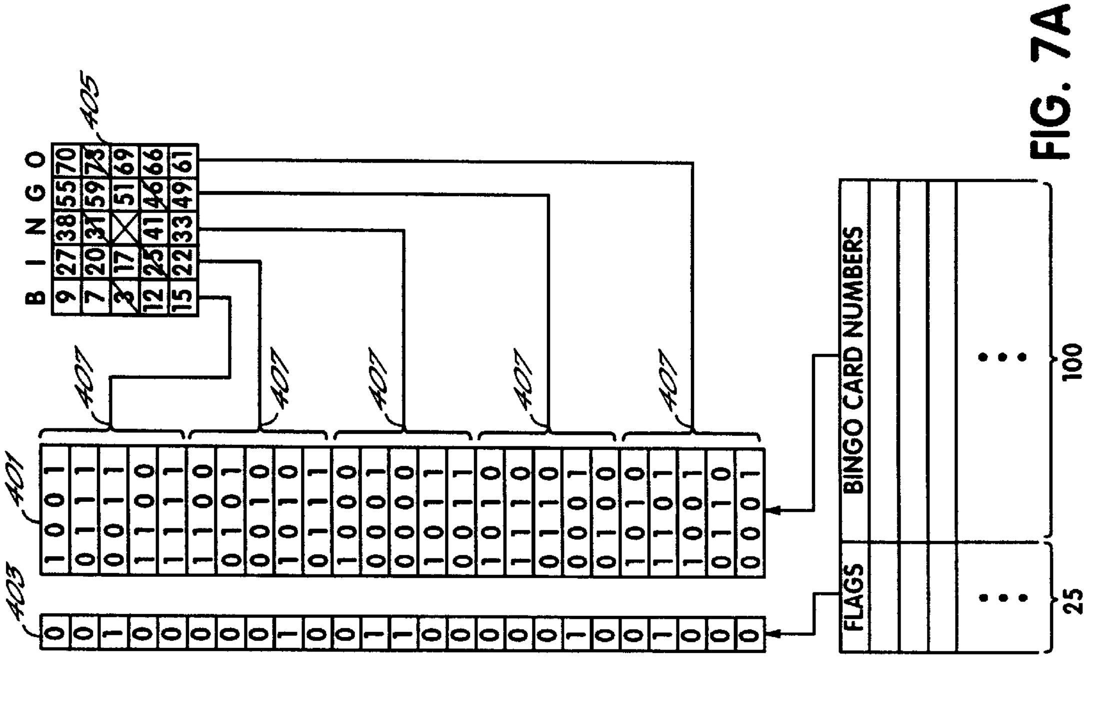
FIG. 7A is a diagram illustrating the data structures used to represent bingo cards in the computer network of FIG. 3.

Referring now to FIGS. 7A and 7B, details on the use of masks to match bingo cards to winning patterns can be described. As seen in FIG. 7A, a bingo card is encoded as a sequence of 4-bit number codes 401 associated with a sequence of flag bits 403. Number codes 401 can be arranged into groups 407 of five number codes, each group

407 relating to one column of a bingo card 405. Within each group 407, there are five number codes representing the five numbers in an associated column of bingo card 405. (The "free space" at the center of the bingo card, i.e., the third row of the third column, is encoded with a "0000" number code 401.)

A conventional bingo card uses different number ranges under each column of the card. Specifically, the first column of the bingo card includes bingo numbers between 1–15. The second bingo column includes numbers between 16–30. The third bingo column includes numbers between 31–45. The fourth bingo column includes numbers between 46–60. The fifth bingo column includes numbers between 61–75. Typically the five columns of a bingo card are associated with the letters B, I, N, G and O as seen on bingo card 405 in FIG. 7A. To encode the numbers on bingo card 405, in accordance with the principles of the present invention, the bingo numbers in a given column of a bingo card are encoded as a value from 1–15. In the first bingo column, a value of 15 is encoded as a binary 4-bit value of "1111" (decimal 15), and a value of 7 is encoded as a 4-bit value of "0101" (decimal 7). In the second column, a value of 30 is encoded as a 4-bit value of "1111" (decimal 15), and a value of 17 is encoded as a 4-bit value of "0010" (decimal 2). Thus, values in the first column are generated by adding zero to the 4-bit binary encoded value of the number code 401. Numbers is the second column determined by adding 15 to the 4-bit binary value encoded in the number code 401. Generally, a bingo number n in column i of a bingo card 405 is encoded with a number code having the binary value $n-15\cdot(i-1)$.

As noted above, each number code 401 for a bingo card is associated with a 1-bit flag 403. Flags 403 indicate whether the associated bingo number has been hit by a previously called bingo number. Thus, in bingo card 405 the third number (3) in the first column, the fourth number (25) in the second column, second number (31) in the third column, the fourth number (46) in fourth column and the second number (73) in the fifth column have been hit by previously called bingo numbers. Accordingly, the flags 403 associated with each of these numbers have been set to a value of "1". (Also, the flag 403 for the "free" space at the center of the bingo card has been set to a value of "1".) The remaining flags 403 have values of "0".

Referring now to FIG. 7B, the use of masks to determine whether a bingo card has winning pattern can be explained. Each winning pattern of a bingo game is associated with a mask 409 such as those shown in FIG. 7B. Each mask 409, is a 25-bit mask of binary values, and is associated with a binary-encoded threshold value 411. Within a mask 409, binary values of "1" identify locations in a bingo card which must hit in order to form a winning pattern. The threshold value 411 associated with the mask identifies the number of hits that must be achieved for a winning pattern to be achieved. Thus for example, to achieve hits across the entire top row of a bingo card, it is necessary to achieve hits in the five locations identified by "1" valued bits in mask 409*a*. As seen in threshold 411*a*, five hits must be achieved in these locations to mark out an entire top row on a bingo card. Similarly, in order to match all four corners of a bingo card 405, hits must be obtained in the four locations identified by "1" valued bits in mask 409*b*. And four total hits must be obtained as shown by threshold 411*b*. Finally, to mark out the diagonal of a bingo card which runs from the lower left corner to the upper right comer of the card, hits must be achieved in the five locations shown in mask 409*c*. To achieve this winning pattern, five hits must be obtained in these locations as shown in threshold 411*c*. (If there is a free space in the center of the bingo card, such as is the case in FIG. 7A, every player begins with a hit in the center space, and thus must accumulate only four more hits while playing the game to mark out a diagonal across the card.)

Using a mask, it is possible to determine whether a bingo card has achieved a winning pattern by the following process. The flags 403 for the bingo card are matched against a mask 409, using a bit-wise AND operation. The result will be a 25-bit value in which a corresponding is bit has a "1" value, only if there is a hit in the corresponding location on the bingo card and a "1" in the mask. If the number of "1" values in the result of the bit-wise AND operation, is equal to the threshold value 411 for that mask, then a winning pattern has been achieved. Otherwise, the winning pattern identified by the mask is not been achieved.

As discussed above, to define the rules for a bingo game, a number of masks are used by each matching computer. Specifically, as shown in FIG. 7B, for a given bingo game, a matching computer may use a first mask 409*a* for determining whether a bingo card has marked the first row, a second mask 409*b* for determining whether a bingo card has marked all four corners, and a third mask 409*c* for determining whether a bingo card has marked the lower left-upper right diagonal.

It will also be appreciated that different threshold values 411 might be used in different matching computers. As noted below, lower level matching computers 90 forward a bingo card to a higher level matching computer when the bingo card becomes close to achieving a winning pattern. To achieve this result, the threshold values 411 used in connection with masks in the lower-level matching computers are different than the threshold values used in higher level matching computers. For example, the lowest level matching computers 90*c* might use a threshold value 411*a* of 3, in conjunction with the mask 409*a* for the top row of a bingo card. As a result, once a bingo card is two hits away from marking the entire top row, the lower-level matching computers 90*c* will consider the card to have achieved a winning pattern, and consequently forward the card to a mid-level matching computer 90*b*. Similarly, the mid-level matching computers 90*b* might use a threshold value 411*a* of 4, in conjunction with mask 409*a*. As a result, once a bingo card is one hit away from marking the entire top row, the mid-level matching computers 90*b* will consider the card to have achieved a winning pattern, and consequently forward the card to the top level matching computer 90*a* (and also send a close player message to game computer 50, if desired). Top-level matching computer 90*a* will use a threshold value 411*a* of 5, in conjunction with mask 409*a*. As a result, once a bingo card marks the entire top row, the top-level matching computer 90*a* will determine that the card has reached a "bingo", and forward the card to the accounting computer 70 for verification, and then to matching computer 50 for announcing the winner.

It will also be appreciated that, in one form of bingo, a prize is awarded to the player having the fewest number of hits at the time that the game ends (a "leaster" game). For a game of this kind, there is no winning pattern per se. Nevertheless, a "leaster" rule can be encoded by a mask, for example, with a mask having all "0" values. Since a mask with all "0" values does not identify any pattern at all, it will be interpreted as indicating a "leaster" prize. Therefore, in response to a mask of all "0" values, the matching computers will count the number of hits on each card, and identify the minimum number of hits on any card being managed by the matching computer. This data can then be used to identify the minimum number of hits needed to win a "leaster" prize.

Referring now to FIGS. 8A-1, 8A-2 and 8B, details of the process performed by matching computers 90 can be elaborated. FIG. 8B illustrates the structure of the matching computer database 92 used by each matching computer performing function of the present invention.

This database includes a number of bingo cards 421 which are to be matched against called bingo numbers. Each stored bingo card 421 includes a field 423 storing an identifier for the card as discussed above, a field 425 for storing an identifier for the game in which the card is participating, fields 427 and 429 for storing the bingo card numbers and the flags associated therewith, and fields 431 and 433 identifying the account number of the account to which the card was sold, and the identifier from the receipt given to the player.

In addition to the bingo cards 421, database 92 stores descriptions of the roles matching computer 90 is performing with respect to each bingo game. Roles are described in records 437, one record 437 for each game in which the matching computer 90 is performing matching functions. Each record 437 includes one or more fields 439 for storing forwarding addresses to which card should be forwarded by the matching computer. As discussed above, lower level matching computers forward bingo cards which are approaching a winning status to higher level matching computers, and the top level matching computer forwards bingo cards which have achieved winning status to accounting computer 70 and game computer 50. In additional to forwarding addresses 439, role description record 437 includes a field 441 identifying the number of cards for the game which are being stored and managed by the matching computer. This information is forwarded to game computer 50 as part of a number of players message. Furthermore, a field 443 stores a "minimum" value for cards being managed by matching computer 90. This value is used if desired as part of a "leaster" game, in which a prize to the player having a bingo card with the fewest spaces matched. A field 445 identifies whether the matching computer is performing a handling role or a backup role for the game. Also, there are a number of fields 447 describing winning patterns for the game. Each field 447 including a sub-field 448 storing an identifier for a mask, a sub-field 450 storing the mask, and a field 452 identifying a threshold number of hits for a card to be forwarded. Use of these fields will be discussed with reference to FIGS. 8A-1 and 8A-2 below.

In addition to the foregoing records, database 92 includes records 455 storing all of the bingo numbers called for each of the games being managed by the matching computer 90. The called numbers are accumulated as bingo numbers are called, and used when additional cards are received by a matching computer.

Finally, a matching computer includes fields 457 identifying the status, active or inactive, of each game being managed by matching computer 90. These fields are also used in determining how to handle bingo cards forwarded to the matching computer.

Referring to FIG. 8A-1, the process performed by a matching computer 90 can be described in more detail. It will be understood that multiple bingo games are simultaneously being managed by each matching computer 90. Also, as with other computers described above, matching computers 90 are event driven, and respond to messages from other computers, to perform the relevant processing with respect to specific ones of the various games being managed by the matching computer. The following discussion will discuss the operations performed by a matching computer in response to received messages, roughly in the order that messages are received during a single bingo game. It will be appreciated, however, that in an environment where multiple games are being simultaneously managed by a matching computer, messages from the various games will be arriving in a potentially random order.

Prior to a bingo game, matching computers 90 receive new card messages 98 (FIG. 4B) as cards are purchased for play in the bingo game. When a new card message is received 461, the bingo card described by the new card message is stored 463. Next the matching computer determines 464 whether the bingo card received is participating in an active game. Initially, cards are sold and sent to matching computers 90 prior to the commencement of a game and therefore, the receiving matching computer proceeds from step 464 to step 466, in which it acknowledges the new card message and is completed with processing.

When a game begins, a game start message 112 (FIG. 4C) is received by the matching computer. When this message is received 468, the matching computer 90 responds by marking the identified game as active (step 470) in the appropriate field 457 in its database 92. The matching computer then acknowledges 472 the game start message.

Once a bingo game has commenced, matching computer 90 receives a number of called number messages for that game, identifying the bingo numbers that have been called for the game, which need to be matched against bingo cards stored by the matching computer 90. When a called number message is received 474, a matching computer proceeds to store the bingo numbers identified in the called number message into the appropriate list 370 of called numbers in database 92 (step 476). Then, the matching computer 90 performs a sequence of steps in which it compares the called number to each bingo card in memory, to determine whether any bingo cards have achieved a winning status. Specifically, in a step 478, matching computer 90 selects a set of all cards in its database being played in one of the games identified by the called number message. Next in step 480, the matching computer initializes (i.e., sets to a value of 0) a variable, which will accumulate a count of these cards. In step 482, matching computer 90 compares the new bingo number from the called number message, to all of the numbers on the current bingo card, and sets the flag for a number on the card if that number matches the called bingo number. Subsequently, in step 484, matching computer 90 compares one mask for the identified game to the flags in the bingo card. Assuming for the moment that the mask is a normal mask (not a "leaster" mask of all "0" values), matching computer determines 486 whether the bitwise AND of the mask with the flags for the card, includes a number of bits which is greater than or equal to the threshold associated with the mask. If not, than the bingo card has not yet achieved a winning status, and matching computer 90 proceeds to step 488 in which it determines whether there are any more masks to be compared to the bingo card. If there are additional masks, matching computer 90 returns to step 484 to compare the flags of the bingo card to the next mask.

If in step 486, the bits in a mask equal or exceed the threshold associated with that mask, then the bingo card has achieved a winning status and should be forwarded to the appropriate forwarding address. As noted above, the forwarding address may be a higher level matching computer, or may be the game computer if the matching computer is the top level matching computer. In either case, if the bits in the mask equal or exceed the threshold, matching computer 90 proceeds to step 490 (FIG. 8A-2) in which it deletes the bingo card from its memory, in preparation for forwarding the bingo card to another location. Next, in step 492, the matching computer determines whether it is the handling computer for the bingo game or is merely performing a backup role. If the computer is merely performing a backup role, no card forwarding is performed. However, if the computer is the handling computer for the game, then the matching computer proceeds to step 494 or step 496. If the handling computer is the top level handling computer (as determined from the forwarding addresses for the game, stored in fields 439 of the handling computer's database 92), then when the bingo card achieves the winning status, a winner message is generated in step 494 and sent to the accounting computer so that the accounting computer will verify that the winner is indeed a winning card. Assuming that this verification is received, in step 495 a winner message is generated and sent to the game computer 50, notifying the game computer of the winning status of the card. If the matching computer is not the highest level matching computer (again, as determined from the forwarding addresses for the game, stored in fields 439 of the handling computer's database 92), then the bingo card is transferred to a higher level matching computer. Specifically, in step 496 a new bingo card message is generated and sent to the accounting computer 70 and to the current higher level matching computers 90 identified by forwarding addresses in fields 439 in the matching computer's database 92. After the new card messages are sent, if relevant, a close player message is generated and delivered to the game computer 50 to inform the game computer that a close bingo card has been found and has been forwarded to one of the higher level matching computers 90. The determination of when a close player message should be forwarded to the game computer is custom programmed by the game administration based upon the amount of player feedback is desired on close bingo cards.

As noted above, there are normal masks and also "leaster" masks. Specifically, to perform matching of bingo cards for a so-called "leaster" game, a blank mask of all "0" values, is included in the winning pattern masks for a game. A blank mask, i.e., a mask having all "0" values, indicates that the game has a prize for the bingo card having the fewest number of spaces marked. Accordingly, special processing is performed if a mask is discovered to be blank in step 484. Specifically, if a blank mask is identified in step 484, processing proceeds to step 498. In step 498, matching computer 90 counts the number of set flags for the bingo card. Then in step 500, the number of set flags is compared to the minimum value stored in field 443 of the role description record 437 in the matching computer's database 92. If the number of set flags in the current card is below the current minimum in field 443, then the minimum stored in the field 443 is adjusted to equal the number of set flags in the current card. If the count of set flags in the current card is not less than the current minimum, then the minimum value in field 443 is not adjusted. By these steps, matching computer 90 generates a record of the current minimum number of marked spaces in bingo cards in its database, allowing the matching computer 90 to deliver this minimum number to game computer 50 along with other statistics in a number of players message, as discussed in further detail below.

After all of the masks for a game have been compared to bingo cards, processing proceeds to step 504, in which the count of bingo cards for the game is incremented, and then to step 506, in which matching computer 90 determines whether there are any more bingo cards for the identified game. If there are additional bingo cards, the next bingo card is selected and processing returns to step 482. If, however, all of the cards for the current game have been analyzed, the accumulated count of cards is stored in field 441 of the role description record 447 in database 92, so that this card count may be subsequently forwarded in a number of players message (step 508).

After thus completing analysis of all cards for one game identified in the called number message, the handling computer proceeds to step 510 in which it determines whether any other games are identified by the called number message. If so, handling computer returns to step 478 to select cards for this next game, and proceeds to process each of those cards.

After all of the cards for all games identified in the called number message have been processed, matching computer 90 proceeds to step 512 in which it generates a number of players message of the format shown in FIG. 4E, including data for each of the games identified in the called number message. As discussed above with reference to FIG. 4E, the fields in the number of players message includes game identifiers, the number of cards for the game (as stored in field 441), and the minimum number of hits for cards in that game (as stored in field 443 in database 92). After step 512, the called number message acknowledged in step 514 and processing is completed.

As can be seen in from the foregoing, during processing of called numbers and matching of cards, cards are forwarded from one matching computer to another using new card messages (see step 496). Thus, a new card message may be received by a matching computer while a game is ongoing. In this case, in processing a new card message, a matching computer will determine in step 464 that the new card is for an active game. In this case, the matching computer 90 will proceed to step 466 to process the new card for inclusion in its database for the active game.

In step 516, matching computer 90 compares each of the bingo numbers stored in the appropriate list 455 in database 92, to each of the numbers on the received bingo card. This step insures that any bingo numbers which are inadvertently missed by other matching computers which previously processed the bingo card, are marked in the bingo card. Next in step 518, matching computer 90 begins the process of comparing a new bingo card to each of the masks stored in the matching computer. Specifically, in step 518, the matching computer compares the flags for the bingo card to one of the masks for the game in which the card is enrolled. This operation is similar that described above with reference to step 484. Next, if the mask is a normal mask, matching computer 90 proceeds to step 520 and determines whether the number of bits falling with the mask equals or exceeds the threshold of the mask stored in database 92. If so, processing proceeds to step 490 (FIG. 8A-2) as discussed above, to delete the bingo card from memory and proceed to forwarded it to another handling computer, or to the accounting computer 70 and game computer 50. If not, processing proceeds to step 522.

If, however, the mask is a blank mask, indicating a game with a "leaster" prize, processing proceeds from step 518 to step 498, in which the number of set flags in the bingo card is counted and compared to the current minimum, as discussed above. Thereafter, matching computer 90 proceeds to step 522.

In step 522, matching computer 90 determines if any further masks are to be compared to the new bingo card. If so, processing returns to step 518. If not, the new bingo card is acknowledged in step 466.

As noted above, during a game, the roles of matching computers may be modified by receipt of role description messages 182, of the format shown in FIG. 4L, and card transfer messages 190 of the format shown in FIG. 4M. When a role description message is received in step 530, matching computer 90 proceeds to step 532 to store the new role description from the role description message into the appropriate fields 439 and 445 of its role description record in 427 in database 92. Then the role description message is acknowledged in step 534. When a card transfer message is received in step 536, the matching computer 90 proceeds to step 538 and generates new card messages for all cards identified by the card transfer message, and transmits these new card messages to the recipients identified in the card transfer message. Next, in step 540, each of these bingo cards is the deleted from database 92, and in step 542, the card transfer message is acknowledged.

As noted above, when a bingo card reaches a winning status, game computer 50 may modify the bingo game in any number of ways to have new winning patterns. This is done by transmitting a modified game message 166 to each of the matching computers, using the format shown in FIG. 4J. When this message is received in step 544, matching computer 90 proceeds in step 546 to delete all of the masks identified for deletion by the modify game message from its game role description records 437. Next, in step 548, the matching computer 90 adds the masks identified for addition by the modified game message, to game role description records 437 for the relevant game. Next, in step 550, matching computer 90 begins a process for determining whether any bingo cards stored in the matching computer have achieved a winning status under the modified rules of the game. Specifically in step 550, one of the bingo cards for the modified game is selected. Next in step 552, the flags of the select bingo card are compared to one of the masks for the identified game. If the mask is a normal mask, the number of bits in the mask is compared to the threshold value for that mask in step 554. If the number of bits in the mask is equal to or greater than the threshold, processing proceeds to step 490 (FIG. 8A-2) where the card is deleted from memory and forwarded to another handling computer or the accounting computer 70 and game computer 50, as appropriate. Then processing proceeds to step 556 in which matching computer 90 determines whether there are any more bingo cards for the modified game. If there are additional bingo cards, processing proceeds from step 556 to step 550 to evaluate the next bingo card. If there are no bingo cards remaining, matching computer 90 proceeds to step 558 to acknowledge the modified game message Returning to step 552, if a mask being compared to a bingo card is a blank mask, indicating that there is a "leaster" prize for the game, processing proceeds to step 498 in which a count is made of the number of set flags in the card, and this count is compared to the current minimum stored in database 92 Thereafter, processing proceeds to step 559 in which matching computer 90 determines whether any additional masks are to be compared to the selected bingo card. Similarly, if the number of bits in a mask do not exceed the threshold in step 554, processing also proceeds to step 559 to determine if any additional masks are to be compared to the selected card.

At the end of bingo game, as discussed above, a game end message 180, of the format shown in FIG. 4K, is transmitted to the all matching computers 90. When a game end message is received in step 560 by a matching computer, matching computer proceeds to step 562 in which it clears the number list record for the identified game and also marks the game inactive in the appropriate field 457 in database 92. Next in step 564, matching computer 90 determines whether to forward all of its cards to the accounting computer 70. If the matching computer 90 is the handling computer (as indicated in field 44 in the database 92), matching computer 90 generates a new card message for each card for the ended game, and forwards each of these new card messages to accounting computer 70. Then, each of the cards is deleted from database 92. If the handling computer is the backup computer for the game, then the cards stored in database 92 are deleted without forwarding to accounting computer 70. Finally, in step 566, the game end message is acknowledged.

As discussed above in some detail, during the administration of bingo games by the network 10 shown in FIG. 3, the configuration and roles of matching computers 90 may be altered to appropriately handle the computational load of the administered bingo games. Referring now to FIGS. 9A, 9B and 9C, various configurations of the matching computers, for one bingo game, are illustrated in various phases in that game Specifically, as seen in FIG. 9A, at the commencement of a game, there are a large number of lowest level matching computers 90*c* for matching called bingo numbers to bingo cards. This is done because at the beginning of the game there are a large number of bingo cards having only a very few matched locations. At this initial stage of the game, there is a much smaller number of mid-level matching computers 90*b*, and only a single highest level matching computer 90*a*.

As the game progresses, as seen in FIG. 9B, some of the lowest level matching computers 90*c* are removed and reconfigured as mid-level matching computers 90*b*. This is done to handle the increasing numbers of bingo cards that are closer to a winning combination, and thus are located in mid-level matching computers.

As seen in FIG. 9C, as the game reaches its termination, and most of the bingo cards playing the game have achieved at least a modest number of hits, the greatest number of cards are found in the mid-level matching computers 90*b* of the network. Accordingly, resources are again reallocated to handle this load. As a result, at this point there are more mid-level matching computers 90*b* than there are lowest level matching computers 90*c*.

Thus, using the methods described above for reallocating resources and reconfiguring matching computers during the progress of a game, the computational resources of computer network 10 can be dynamically reallocated as needed to handle the load of bingo card matching tasks as the game progresses. It will appreciated that as multiple games are played simultaneously on computer network 10, the allocation of resources among the matching computers 90 may become more balanced as some bingo games are initially starting as other game are reaching a terminating point.

It will be appreciated that the roles of matching computers 90 may be different for different games; that is, a matching computer which a lowest level matching computer for one bingo game may be acting as a mid-level matching computer for a second game and acting as the highest level matching computer for a third game. This flexibility permits a nearly infinite variety of roles and resource allocations to be applied to any particular situation.

Furthermore, it will be appreciated that the number of matching computers 90 is not limited in any way, and if network computational loads become excessive, additional matching computers 90 may be brought online on an as-needed basis, to carry the added computational burden, thus providing a nearly infinite bingo card matching functionality.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Specifically, principles of the present invention may be applied to any form of gaming in which randomly selected symbols are compared to symbols assigned to a user, such as lotteries, keno games, or other games of this type. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A computer network managing a game in which players are assigned arrays of locations, each location in each array being associated with one of a plurality of numbers, and then randomly drawn numbers are matched to locations on said arrays until the matched locations on one array form a predetermined pattern, said network comprising:

a first computer storing a first group of one or more of said arrays of locations, a second computer storing a second group of one or more of said arrays of locations, said first and second computers being connected together via a network to permit electronic communication therebetween, said first and second computers simultaneously and in parallel comparing a drawn number to said arrays of locations, said first computer comparing matched locations in said arrays to a first pattern, said second computer comparing matched locations in said arrays to a second pattern different than said first pattern, said computers generating and transmitting signals over said network in response to comparing matched locations in said arrays to said patterns, said signals indicating that matched locations on an identified array have an identified relationship to said predetermined pattern.

2. The computer network of claim 1 wherein said first computer generates and transmits signals over said network upon determining that matched locations on said identified array form said predetermined pattern, and said second computer generates and transmits signals over said network upon determining that matched locations on said identified array form a portion of said predetermined pattern.

3. The computer network of claim 2 wherein said second computer responds to said signals transmitted over said network from said first computer by discontinuing comparisons between drawn numbers and arrays.

4. The computer network of claim 2 wherein said second computer responds to said signals transmitted over said network from said first computer by comparing matched locations in said arrays to a new predetermined pattern.

5. The computer network of claim 2 wherein said second computer generates and transmits signals over said network upon determining that only one more location on said identified array need be matched to a drawn number for the matched locations of said identified array to form said predetermined pattern.

6. The computer network of claim 2 further comprising a third computer storing a group of one or more of said arrays of locations, said third computer being connected to said network, said third computer comparing a drawn number to said arrays of locations, and comparing matched locations in said arrays to said predetermined pattern, simultaneously and in parallel with said first and second computers, said third computer generating and transmitting signals over said network identifying an array, said signals being generated and transmitted upon determining that two more locations on said identified array need be matched to a drawn number for the matched locations of said identified array to form said predetermined pattern.

7. The computer network of claim 1, further comprising a communications connection to a location associated with a player, said computers activating said communications connection being activated upon determining that matched locations in said player's array form or are close to forming said predetermined pattern, and delivering communications via said communications connection to an audience monitoring said game.

8. The computer network of claim 7, further comprising a database of telephone numbers of players assigned to arrays, wherein said computers activate said communications connection by dialing a telephone number assigned to a player.

9. The computer network of claim 7, further comprising a database of Internet addresses of players assigned to arrays, wherein said computers activate said communications connection by connecting to an Internet address assigned to a player.

10. The computer network of claim 7, wherein said communication connection leads to a retail location where said player purchased said player's array.

11. The computer network of claim 1, wherein said first and second computers compare matched locations in said arrays to a second predetermined pattern.

12. The computer network of claim 1, wherein said first and second computers are responsive to signals transmitted over said network to alter said predetermined pattern to a new pattern, to subsequently compare matched locations in said arrays to said new pattern.

13. The computer network of claim 1, wherein said first computer is responsive to signals transmitted over said network to store an additional array for subsequent comparison to drawn numbers.

14. The computer network of claim 13, wherein said first computer further comprises prior number storage for storing a complete list of drawn numbers since the initiation of a game, and said first computer, upon receipt of an additional array, compares said additional array to all drawn numbers in said prior number storage.

15. The computer network of claim 1, adapted for management of a second game in which matched locations of arrays are compared to a preset pattern, wherein said first computer stores a third group of one or more arrays of locations, said second computer stores a fourth group of one or more arrays of locations, said first and second computers simultaneously and in parallel comparing a drawn number to arrays of said first, second, third and fourth groups, and comparing matched locations in said arrays of said first and second group to said predetermined pattern, and comparing matched locations in said arrays of said second and third groups to said preset pattern, said computers generating and transmitting signals over said network in response to comparing matched locations in said arrays to said predetermined and preset patterns, said signals indicating that matched locations on an identified array have an identified relationship to said predetermined or preset pattern.

16. The computer network of claim 15, wherein said first and second computers compare at least one drawn number only to arrays in said first and second groups, and compare another drawn number only to arrays in said third and fourth groups.

17. A computer network for managing a game in which players are assigned arrays of locations, each location in each array being associated with one of a plurality of numbers, and then randomly drawn numbers are matched to locations on said arrays until the matched locations on one array form a predetermined pattern, said network comprising:

a first computer storing a first group of one or more of said arrays of locations, a second computer storing a second group of one or more of said arrays of locations, wherein said first and second computers are connected together via a network to permit electronic communication therebetween, said first and second computers simultaneously and in parallel compare a drawn number to said arrays of locations, said second computer generates signals transmitted over said network which include said identified array, and said first computer responds to said signals transmitted over said network from said second computer by storing said identified array in said first computer for subsequent comparison to drawn numbers.

18. A computer network for managing a game in which players are assigned arrays of locations, each location in each array being associated with one of a plurality of numbers, and then randomly drawn numbers are matched to locations on said arrays until the matched locations on one array form a predetermined pattern, said network comprising:

a first computer storing a first group of one or more of said arrays of locations, a second computer storing a second group of one or more of said arrays of locations, wherein said first and second computers are connected together via a network to permit electronic communication therebetween, said first and second computers simultaneously and in parallel compare a drawn number to said arrays of locations, said first and second computers generate and transmit signals over said network which indicate characteristics or a number of arrays in said first and second groups stored in said computers.

19. The computer network of claim 18 wherein said computers evaluate each array to determine a number of locations in the array needed to be matched for the matched locations in the array to form said predetermined pattern, and said computers generate statistics on numbers of arrays needing specific numbers of locations to be matched.

20. The computer network of claim 19, wherein said signals generated and transmitted by said computers incorporate said statistics.

21. A computer network managing a game in which players are assigned arrays of locations, each location in each array being associated with one of a plurality of numbers, and then randomly drawn numbers are matched to locations on said arrays until the matched locations on one array form a predetermined pattern, said network comprising a first computer storing a first group of one or more of said arrays of locations, a second computer storing a second group of one or more of said arrays of locations, and a third computer, said first and second computers comparing drawn numbers to said arrays of locations, and comparing matched locations in said arrays to said predetermined pattern, said third computer being responsive to a startup signal to begin comparing drawn numbers to arrays of locations in said first group, and comparing matched locations in said arrays to said predetermined pattern.

22. The computer network of claim 21, wherein said startup signal identifies arrays of locations in said first group, said third computer comparing drawn numbers to arrays of locations identified in said startup signal after receipt of said startup signal.

23. The computer network of claim 22, wherein said startup signal is generated by said first computer.

24. The computer network of claim 22, further comprising an accounting computer storing backup copies of said first and second groups of arrays, wherein said startup signal is generated by said accounting computer and transmitted to said third computer upon detection of a failure in said first computer, thereby transferring all arrays in said first group to said third computer.

* * * * *